United States Patent
Matteson

(10) Patent No.: US 10,394,898 B1
(45) Date of Patent: Aug. 27, 2019

(54) METHODS AND SYSTEMS FOR ANALYZING DISCRETE-VALUED DATASETS

(71) Applicant: The MathWorks, Inc., Natick, MA (US)

(72) Inventor: Andrew Matteson, Cambridge, MA (US)

(73) Assignee: The MathWorks, Inc., Natick, MA (US)

( * ) Notice: Subject to any disclaimer, the term of this patent is extended or adjusted under 35 U.S.C. 154(b) by 678 days.

(21) Appl. No.: 14/855,247

(22) Filed: Sep. 15, 2015

Related U.S. Application Data

(60) Provisional application No. 62/050,732, filed on Sep. 15, 2014.

(51) Int. Cl.
   *G06F 16/00* (2019.01)
   *G06F 16/93* (2019.01)
   *G06F 16/2457* (2019.01)

(52) U.S. Cl.
   CPC ........ *G06F 16/93* (2019.01); *G06F 16/24578* (2019.01)

(58) Field of Classification Search
   None
   See application file for complete search history.

(56) References Cited

U.S. PATENT DOCUMENTS

| | | | | |
|---|---|---|---|---|
| 7,945,668 | B1* | 5/2011 | Nucci | G06N 99/005 707/999.001 |
| 8,290,961 | B2* | 10/2012 | Chew | G06F 17/30675 704/1 |
| 2007/0255746 | A1* | 11/2007 | Summa | G06F 17/30994 |
| 2009/0125498 | A1* | 5/2009 | Cao | G06F 17/30663 |

(Continued)

FOREIGN PATENT DOCUMENTS

WO   WO 2013/163134 A2   10/2013

OTHER PUBLICATIONS

Cheng et al., "Biomolecular Events in Cancer Revealed by Attractor Metagenes," PLOS Computational Biology, 9(2): 1-14 (Feb. 2013).

(Continued)

*Primary Examiner* — Bai D Vu
(74) *Attorney, Agent, or Firm* — Finnegan, Henderson, Farabow, Garrett & Dunner, LLP

(57) ABSTRACT

Methods and systems disclosed herein may be used to determine the structure of a dataset comprising discrete-valued data corresponding to features and items. In some embodiments, a device may receive a discrete-valued matrix with a first dimension corresponding to items and a second dimension corresponding to features. The device may calculate an engineered features set and a weights set for the matrix. The device may update the engineered features set using the weights set, and update the weights set using the updated engineered features set based on the mutual information between the matrix and one of the updated engineered features set. The device may receive a request indicating at least one of the engineered features set, identify items based on the matrix and the indicated at least one of the engineered features set, and provide a response based on the identified items.

21 Claims, 11 Drawing Sheets

(56) References Cited

U.S. PATENT DOCUMENTS

| | | | | |
|---|---|---|---|---|
| 2010/0217731 A1* | 8/2010 | Fu | .................... | G06F 17/30705 |
| | | | | 706/20 |
| 2012/0296891 A1* | 11/2012 | Rangan | ............... | G06F 17/3069 |
| | | | | 707/722 |
| 2015/0081725 A1* | 3/2015 | Ogawa | .............. | G06F 17/30595 |
| | | | | 707/754 |
| 2015/0112918 A1* | 4/2015 | Zheng | .................... | G06Q 30/02 |
| | | | | 706/48 |

OTHER PUBLICATIONS

Cheng, Wei-Yi, "Attractor Molecular Signatures and Their Applications for Prognostic Biomarkers," Graduate School of Arts and Science, Columbia University (2014) (131 pages).

Landauer et al., "An Introduction to Latent Semantic Analysis," Discourse Processes, 25:259-284 (1998) (41 pages).

* cited by examiner

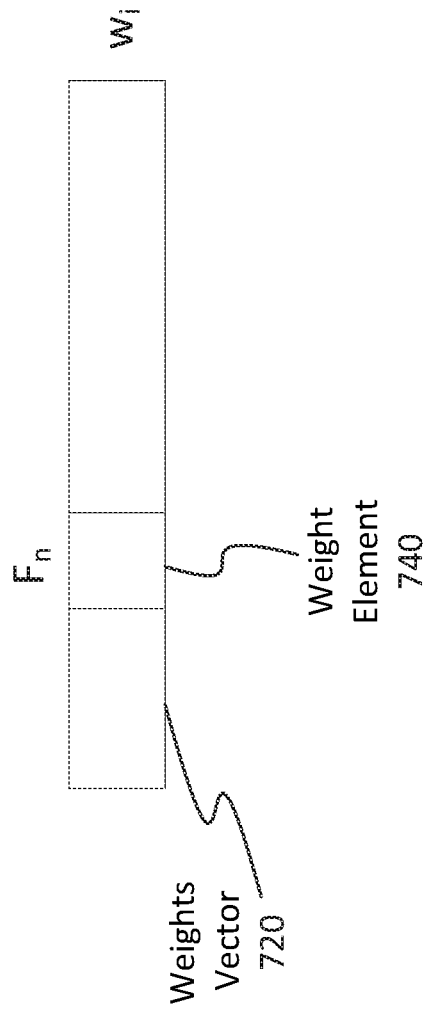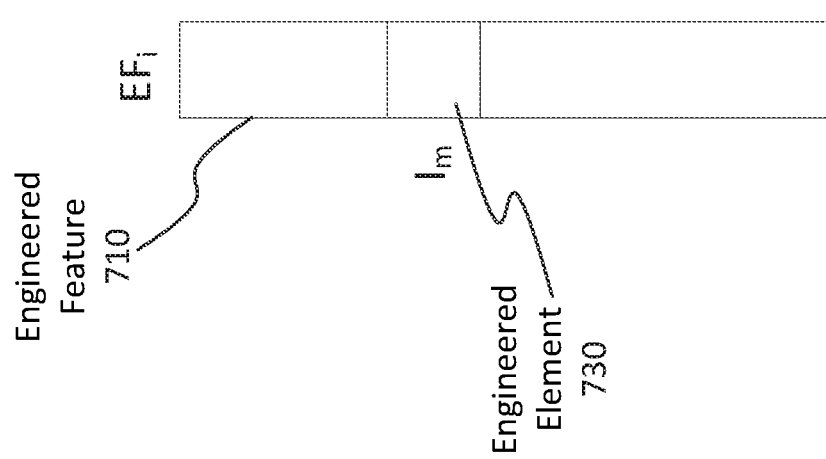
Fig. 7B
Fig. 7A

METHODS AND SYSTEMS FOR ANALYZING DISCRETE-VALUED DATASETS

RELATED APPLICATIONS

The present application claims the benefit of U.S. Provisional Application No. 62/050,732, filed Sep. 15, 2014, which is incorporated herein in its entirety.

SUMMARY

The disclosed methods and systems may improve computer-implemented document retrieval, content retrieval and automatic translation technologies by (i) reducing the requirements for computer memory and computer processing power, and (ii) making better use of existing computer architectures. These improvements may be achieved through the identification, consistent with disclosed embodiments, of latent structures present in databases from which documents or content are retrieved, or databases used for automatic translation. The disclosed embodiments may include, for example, technical improvements to computer-implemented document retrieval, content retrieval, and automatic translation technologies. These embodiments may associate features of a discrete-valued dataset with latent structures in the dataset. According to the disclosed embodiments, these associations may preserve contextual information permitting interpretation of the identified latent structures. The contextual information may also be used to generate additional associations and refine existing associations. Some embodiments may iteratively update these associations. Certain embodiments may subset a dataset based on contextual information pertaining to identified latent structures, reducing the time and memory cost of the analysis and improving accuracy by focusing computational resources on relevant subsets of the overall dataset.

The disclosed embodiments may include, for example, a system comprising one or more processors. The processors may be for receiving a matrix with a first dimension corresponding to items, a second dimension corresponding to features, and discrete-valued elements indicating a presence or an absence of the features in the items. The processors may be for calculating an engineered features set and weights set for the matrix. This calculation may include updating a first engineered feature of the engineered features set based on a product of the matrix and first weights vector of the weights set. This calculation may also include updating the first weights vector of the weights set based on a mutual information of the matrix and the first engineered feature. The processors may be for receiving a request indicating at least one of the engineered features set, identifying items based on the matrix and the indicated at least one of the engineered features set, and providing a response based on the identified items. In various aspects, the first engineered feature is updated and then the first weights vector is updated. In certain aspects, the response may include one or more of the identified items.

In some aspects, the engineered features set may include a second engineered feature. Calculating the engineered features set and the weights set may further comprise determining a subset of the matrix, updating the second engineered feature of the engineered features set based on a product of the subset and a second weights vector of the weights set, updating the second weights vector of the weights set based on a mutual information of the subset and the second engineered feature.

In some aspects, the subset of the matrix may depend on values of the first weights vector and a threshold value. In certain aspects, the subset of the matrix may depend on values of the first engineered feature and a threshold value. In various aspects, calculating the engineered features set and the weights set may further include generating clusters by clustering the items using at least the first engineered feature. The subset may further include rows of the matrix corresponding to items of a first one of the clusters.

In some aspects, the processors may also be for associating an additional item with a second one of the clusters based on calculated values of at least the first engineered feature for the additional item. In various aspects, a correlation between the first engineered feature and the matrix is negative, and updating the first weights vector based on the mutual information of the matrix and the first engineered feature comprises calculating a negative of the mutual information of the first engineered feature and the matrix.

In various aspects, the engineered features set may include a second engineered feature. Calculating the engineered features set and the weights set may further comprise calculating the second engineered feature and a second weights vector based on pre-categorized training data. In some aspects, calculating the engineered features set and the weights set may further comprise calculating additional engineered features until a machine learning task performed using the first engineered feature and the additional engineered features satisfies a performance criterion.

The disclosed embodiments may also include, for example, a non-transitory computer-readable medium containing instructions. When executed by a processor, these instructions may cause a device to perform operations. The operations may include receiving a discrete-valued dataset comprising rows corresponding to items and columns corresponding to features. The operations may further include calculating, based on the discrete-valued dataset a first engineered feature and a first weights vector. The first engineered feature may indicate a first latent structure in the discrete-valued dataset. The elements of the first engineered feature may correspond to the items of the discrete-valued dataset. The first weights vector may provide context for interpreting the first engineered feature. Elements of the first weights vector may correspond to the features of the discrete-valued dataset. Calculating the first engineered feature may comprise iteratively updating, until a condition is satisfied, the elements of the first engineered feature and the elements of the first weights vector. The elements of the first engineered feature may be updated based on a product of the first weights vector and rows of the discrete-valued dataset. The elements of the first weights vector may be updated based on a product of the first engineered feature and columns of the discrete-valued dataset. The operations may include generating a subset of the discrete-valued dataset based on at least the first engineered feature. The operations may also include calculating, using the subset of the discrete-valued dataset, a second engineered feature and a second weights vector. The second engineered feature may be indicative of a second latent structure in the discrete-valued dataset. The first engineered feature may provide context for interpreting the second engineered feature. The operations may include outputting indications of the first latent structure and the second latent structure. In some aspects, the elements of the first engineered feature are updated and then the elements of the first weights vector are updated.

In some aspects, the operations may further include receiving a query item, calculating discrete values of the features for the query item, and calculating values of the first engineered feature and the second engineered feature for the query item. The values of the first engineered feature and the second engineered feature for the query item may be based on the first weights vector and the second weights vector. The operations may include determining one or more similar items in the discrete-valued dataset based on at least the first engineered feature and the second engineered feature.

In various aspects, the subset of the discrete-valued dataset may depend on the elements of the first weights vector and a threshold. In certain aspects, the subset of the discrete-valued dataset may depend on the elements of the first engineered feature and a threshold. In various aspects, the subset of the discrete-valued dataset may be generated based on at least the first engineered feature. Generation may comprise clustering the items using at least the first engineered feature. The subset may comprise rows of the discrete-valued dataset corresponding to items of a cluster.

In some aspects, a first element of the first weights vector may correspond to a first feature. The value of the first element depends on a negative of a mutual information of the first engineered feature and a column of the discrete-valued dataset corresponding to the first feature, and a correlation between the first engineered feature and the column of the discrete-valued dataset may be negative.

In various aspects, the operations may further include calculating additional engineered features until a machine learning task performed using the first engineered feature and the additional engineered features satisfies a performance criterion.

The disclosed embodiments further include, for example, a computer-implemented method. The method may comprise steps. The steps may include receiving a first word on a computer. The first word may correspond to a term in a first term-document matrix for a first corpus of documents in a first language. The steps may include identifying a first engineered feature of the first term-document matrix corresponding to the first word. The steps may further include determining a second engineered feature of a second term-document matrix corresponding to the first engineered feature. The second term-document matrix may be for a second corpus of documents in a second language. The steps may include identifying one or more second words in the second language corresponding to the second engineered feature. The steps may also include providing the identified one or more second words to a user or non-transitory memory.

In certain aspects, the first engineered feature and the second engineered feature may correspond to a common concept. In some aspects, the first word may concern a concept in the first language. The identified one or more second words may concern the concept in the second language.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 7A depicts an exemplary representation of an engineered feature.

FIG. 7B depicts an exemplary representation of a weight.

DETAILED DESCRIPTION

Figure 1:
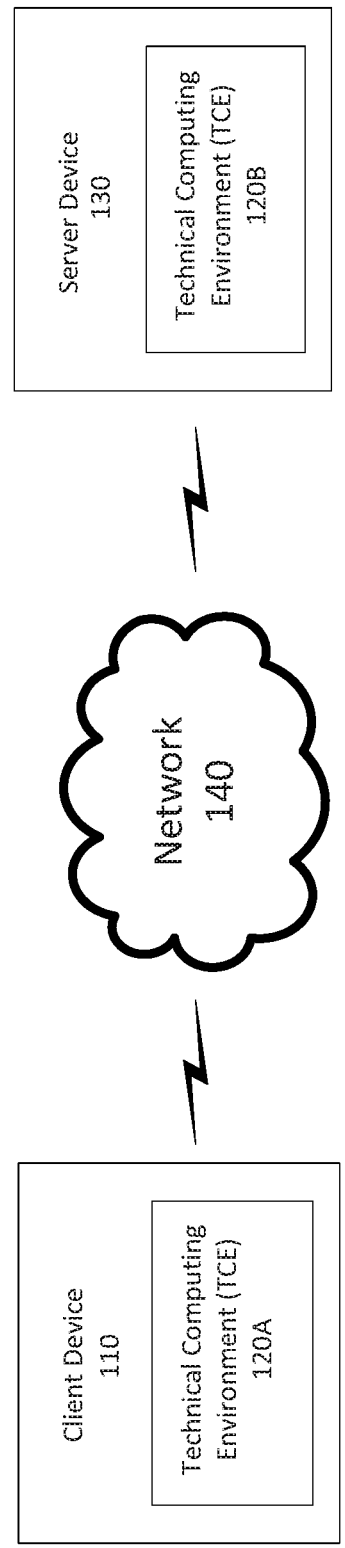
FIG. 1 depicts a schematic of an exemplary environment for determining a structure of a discrete-valued dataset.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

Present methods and systems for document retrieval, content retrieval, and automatic translation exhibit several deficiencies. First, many such methods and systems use techniques that obscure the relationship between the data and latent structures identified from the data, or generate relationships lacking real-world correlates. For example, singular value decomposition may express latent structures as components of the overall variance of the dataset, an unintuitive representation that fails to make use of the context provided by the underlying data. Second, many existing methods and systems are unable to exploit existing distributed computing resources enabling efficient processing of discrete-valued datasets. Finally, existing methods and systems often scale poorly with increasing dataset size and complexity. Such methods and systems may require significant amounts of memory; the number of required calculations may increase with the third power of the size of the dataset. Improved methods and systems for document retrieval, content retrieval and automatic translation may make use of context provided by underlying data, represent underlying latent structures in comprehensible ways, scale efficiently to larger discrete-valued datasets, and have the potential to take advantage of existing distributed computing resources.

Methods and systems described herein involve determining a structure of one or more discrete-valued datasets. FIG.

1 depicts a schematic of an exemplary environment 100 for determining a structure of a discrete-valued dataset, consistent with disclosed embodiments. Environment 100 may include a client device 110. Client device 110 may include a technical computing environment (TCE), such as TCE 120A. Environment 100 may include a server device 130, which may include a TCE, such as TCE 120B. Environment 100 may include a network 140. Devices of environment 100 may interconnect via wired connections, wireless connections, or a combination of wired and wireless connections.

Client device 110 may include a device capable of receiving, generating, storing, processing, and/or providing information, such as information described herein. For example, client device 110 may include a computing device (e.g., a desktop computer, a laptop computer, a tablet computer, a handheld computer, a server, etc.), a mobile phone (e.g., a smart phone, a radio telephone, etc.), or a similar device. In some implementations, client device 110 may receive information from and/or transmit information to server device 130.

As indicated above, TCE 120A may be provided within a computer-readable medium of client device 110. Additionally, or alternatively, TCE 120B may be provided in another device (e.g., server device 130) that is accessible by client device 110.

A TCE may include hardware or a combination of hardware and software that provides a computing environment enabling users to perform certain tasks more efficiently than in other computing environments, such as computing environments requiring the user to develop code in a conventional programming language, such as C++, C, Fortran, Pascal, or similar languages. In some embodiments, the tasks may concern certain disciplines, including, as a non-limiting example, mathematics, science, engineering, medicine, business, and similar disciplines. A TCE may be configured to improve runtime performance when performing computing operations. For example, a TCE may include a just-in-time (JIT) compiler.

One or more of client device 110 and sever device 130 may be configured to implement a TCE as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

A TCE may include a dynamically-typed programming language (e.g., the M language, a MATLAB® language, a MATLAB-compatible language, a MATLAB-like language, etc.) that can be used to express problems and/or solutions in mathematical notations. In some embodiments, the programming language may be a high-level programming language suitable for non-professional programmers. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 120A and/or TCE 120B. During runtime, when the statement "A='hello'" is executed, the data type of variable "A" may be a string data type. Later when the statement "A=int32([1, 2])" is executed, the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

A TCE may be configured to support array-based programming. In some embodiments, a TCE may be configured with a basic array data type. In some aspects, instances of this basic array data type may not require dimensioning. In certain embodiments, a TCE may support vectorization, a programming concept known to one of skill in the art. As a non-limiting example, vectorization uses operations on arrays in place of operations on scalar values. For example, vectorized array multiplication may be performed without individually generating each element of the output array by looping through each combination of input array elements.

A TCE may be configured to perform mathematical computations and provide mathematical tools for use in data analysis, data visualization, application development, simulation, modeling, algorithm development, and similar tasks. The mathematical computations and tools may concern applications in diverse fields including, as a non-limiting example, statistics, image processing, signal processing, control design, life sciences modeling, discrete event analysis and/or design, and state based analysis and/or design. As a non-limiting example, a TCE may be configured to perform mathematical computations, or to provide mathematical functions, regarding plots, surfaces, images, and volumetric representations.

A TCE may be configured to provide mathematical tools using toolboxes (e.g., toolboxes for signal processing, image processing, data plotting, parallel processing, and similar toolboxes.). In some implementations, a TCE may be configured to provide objects for implementing mathematical tools in a graphical programming environment (e.g., function blocks for use with Simulink® software). In certain implementations, a TCE may be configured to provide mathematical tools using one or more function libraries. In various embodiments, a TCE may be configured to provide mathematical tools using a local data structure, a remote data structure (e.g., a database operating in a computing cloud), a remote procedure call (RPC), and/or an application programming interface (API). As would be recognized by one of skill in the art, the particular manner of providing mathematical tools is not intended to be limiting.

A TCE may be configured to generate code, consistent with disclosed embodiments. As a non-limiting example, a TCE may be configured to generate one or more of source code, assembly language code, binary code, and other executable code. For example, a TCE may be configured to generate C, C++, SystemC, Java, or similar code. As an additional example, a TCE may be configured to generate Unified Modeling Language (UML) based representations and/or extensions. In some embodiments, a TCE may generate code from at least a portion of a model. In some aspects, the model may be defined in a graphical modelling language (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), or a similar graphical modeling language). In certain embodiments, a TCE may be configured to generate code by transforming code from a first format into a second format.

A TCE may be configured to generate metadata. As a non-limiting example, a TCE may be configured to generate one or more of interface information, configuration information, performance information, and similar information. In some embodiments, a TCE may generate metadata from at least a portion of a model.

Server device 130 may include one or more devices capable of receiving, generating, storing, processing, and/or providing information, such as information described herein. For example, server device 130 may include a computing device, such as cloud computing platform, a server cluster, a server, a desktop computer, a laptop computer, a tablet computer, a handheld computer, or a similar computing device. As shown in FIG. 1, server device 130 may host TCE 120B in some embodiments.

Network 140 may include one or more wired and/or wireless networks. For example, network 140 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Consistent with disclosed embodiments, the number and/or arrangement of networks and/or devices may differ from exemplary environment 100 shown in FIG. 1. Furthermore, two or more devices shown in FIG. 1 may be implemented within a single device, or a single device shown in FIG. 1 may be implemented as multiple, distributed devices. Additionally, a function described with regard to FIG. 1 as being performed by one or more devices shown in FIG. 1 may be performed by one or more other devices without departing from the embodiments described herein.

Figure 2:
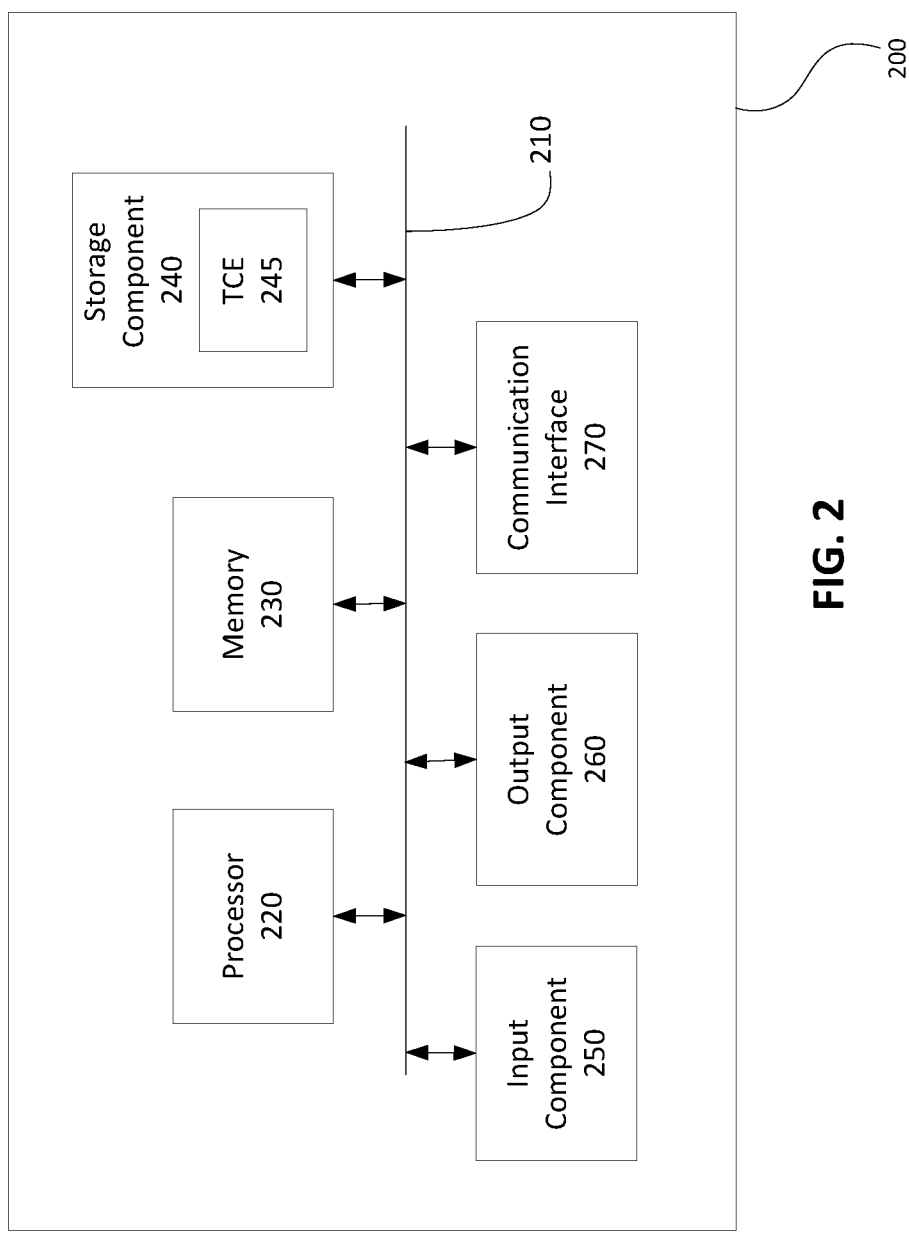
FIG. 2 depicts a schematic of an exemplary device for determining a structure of a discrete-valued dataset.

FIG. 2 depicts a schematic of an exemplary device 200 for computing a structure of a discrete-valued dataset, consistent with disclosed embodiments. Client device 110 may correspond to one or more of device 200, and/or one or more components of device 200. Server device 130 may correspond to one or more of device 200, and/or one or more components of device 200. As shown in FIG. 2, device 200 may include a bus 210, a processor 220, a memory 230, a storage component 240, an input component 250, an output component 260, and a communication interface 270.

Bus 210 may include a path that permits communication among the components of device 200. Processor 220 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions. In some implementations, processor 220 may include multiple processor cores for parallel computing. Memory 230 may include a random access memory (RAM), a read only memory (ROM), and/or another type of dynamic or static storage component (e.g., a flash, magnetic, or optical memory) that stores information and/or instructions for use by processor 220.

Storage component 240 may store information and/or software related to the operation and use of device 200. For example, storage component 240 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 240 may store TCE-245.

Input component 250 may include a component that permits a user to input information to device 200 (e.g., a touch screen display, a keyboard, a keypad, a mouse, a button, a switch, or similar input device.). Output component 260 may include a component that outputs information from device 200 (e.g., a display, a speaker, one or more light-emitting diodes (LEDs), or similar output device.).

Communication interface 270 may include a transceiver-like component, such as a transceiver and/or a separate receiver and transmitter, which enables device 200 to communicate with other devices, such as via a wired connection, a wireless connection, or a combination of wired and wireless connections. For example, communication interface 270 may include an Ethernet interface, an optical interface, a coaxial interface, an infrared interface, a radio frequency (RF) interface, a universal serial bus (USB) interface, or the like.

Device 200 may perform various operations described herein. Device 200 may perform these operations in response to processor 220 executing software instructions included in a computer-readable medium, such as memory 230 and/or storage component 240. A computer-readable medium may be defined as a non-transitory memory device. A memory device may include memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of, or in combination with, software instructions to perform one or more processes described herein. Thus, implementations described herein are not limited to any specific combination of hardware circuitry and software.

The number of components shown in FIG. 2 is provided as an example. In practice, device 200 may include additional components, fewer components, different components, or differently arranged components than those shown in FIG. 2. Additionally, or alternatively, one or more components of device 200 may perform one or more functions described as being performed by another one or more components of device 200.

Consistent with disclosed embodiments, the type, number, and/or arrangement of components may differ from exemplary device 200 shown in FIG. 2. Furthermore, two or more components shown in FIG. 2 may be implemented within a single component, or a single component shown in FIG. 2 may be implemented as multiple, distributed components. Additionally, functions described with regard to FIG. 2 as being performed by components shown in FIG. 2 may be performed by other components (e.g. other devices shown in FIG. 2) without departing from the embodiments described herein.

Figure 3:
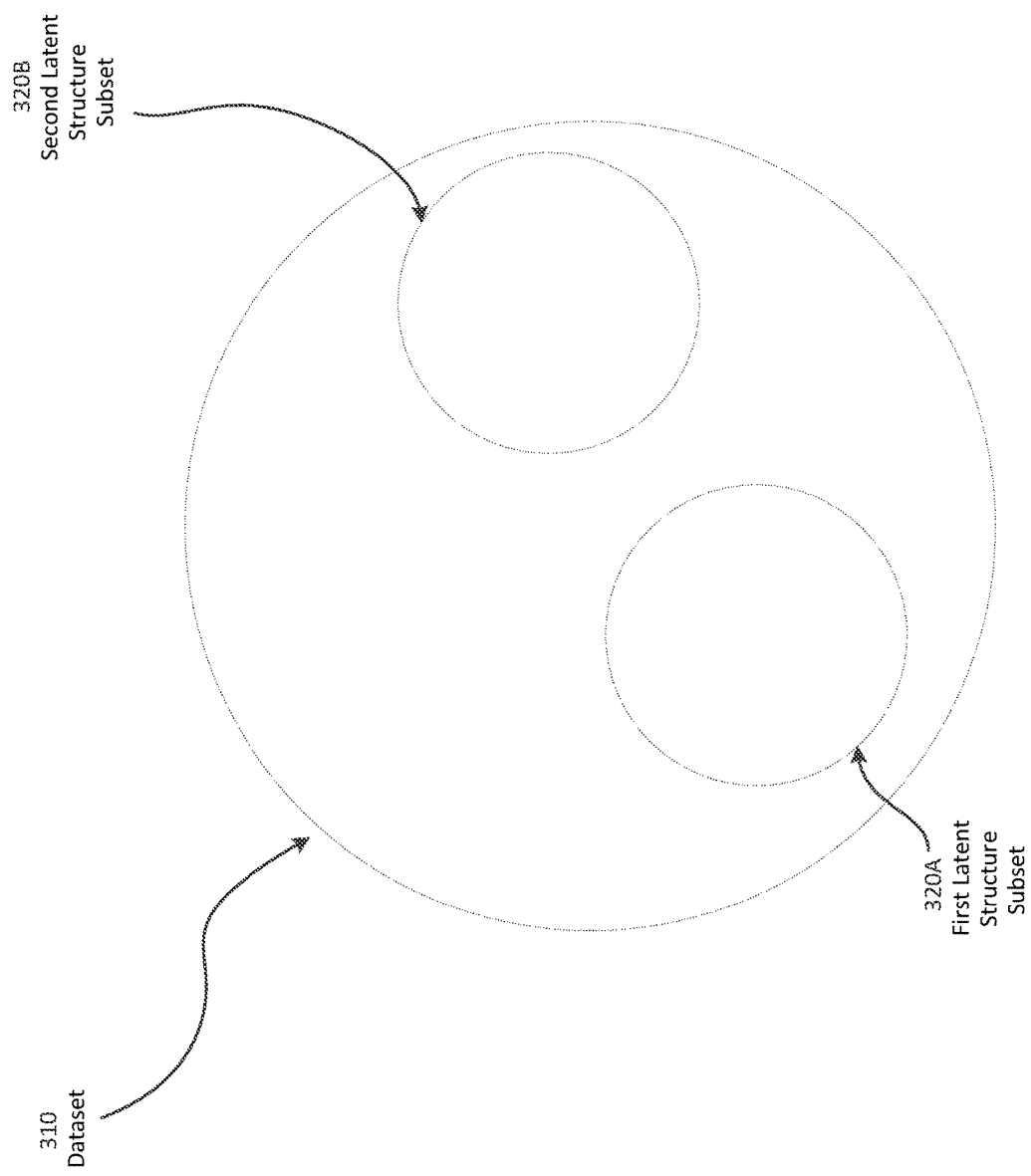
FIG. 3 depicts an exemplary discrete-valued dataset containing subsets.

Methods and systems described herein involve determining a structure of one or more discrete-valued datasets. FIG. 3 depicts an exemplary discrete-valued dataset containing subsets consistent with disclosed embodiments. Dataset 310 may represent items and features. As a non-limiting example, items may include documents, products, advertisements, objects, experiments, patients, test subject, entities, or similar distinguishable elements. Features may correspond to the distinguishable characteristics of the items in dataset 310. For example, dataset 310 may represent a corpus of documents. Then the items may be documents and the features may include words. As an additional example, dataset 310 may represent a collection of physical objects. Then the items may be objects and the features may include descriptors of objects such as color. As a further example, dataset 310 may represent a program of experiments. Then the items may be experiments and the features may include the presence or absence of certain protocols. As an additional example, dataset 310 may represent a collection of patients. Then the items may be patients and the features may include the presence or absence of clinical conditions, symptoms, signs, or histories. As would be recognized by one of skill in the art, the set of potential items and potential characteristics is expansive and far exceeds those examples listed above.

Features may include discrete-valued elements, consistent with disclosed embodiments. In some embodiments, features may take binary values corresponding to the presence or absence of a feature. For example, a feature may indicate the presence of a word in a document or indicate that an item is the color red. In certain embodiments, the features may correspond to indicator functions, and element values may indicate membership in a set or subset. In some embodiments, the features may contain elements with one of a range of discrete values, such as categorical data, or ordinal data.

Latent structures, as described herein, may include organizing genres, topics, concepts, or associations that affect the observed feature values but are not explicitly identified in the data. For example, the concept of "moral virtue" may affect the presence, absence, or frequency of use of words in a document. Words such as "virtue," "excellence," "piety," "goodness," or similar words may appear in documents concerning moral virtue. As an additional example, the topic "war" may affect the presence or absence of tropes in a movie. Tropes such as the "last stand," the "secret mission," the "band of brothers," the "dirty dozen," and similar fictional devices may appear in war movies more frequently than other movies. As would be recognized by one of skill in the art, the above examples are not intended to be limiting.

Dataset 310 may include subset 320A corresponding to a first latent structure in the dataset 310. Dataset 310 may also include subset 320B corresponding to a second latent structure in the dataset 310. This second latent structure may correspond to a topic, concept, or association distinct from the first latent structure. Items in dataset 310 may belong to one or more subsets such as 320A and 320B. In some embodiments, the systems and/or methods described herein may use latent structures to improve the accuracy of document and content retrieval.

Figure 4:
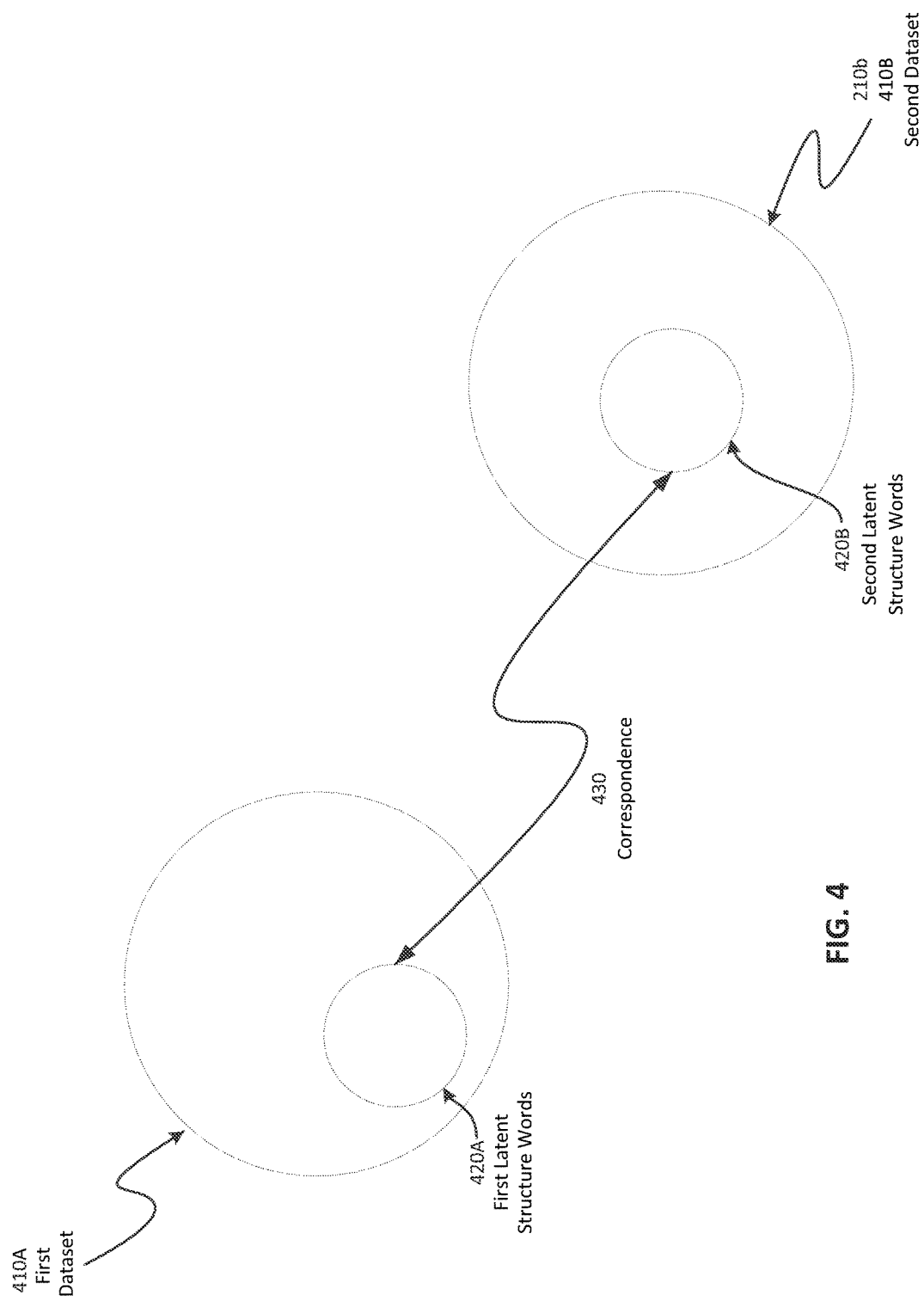
FIG. 4 depicts a correspondence between subsets in two exemplary discrete-valued datasets.

FIG. 4 depicts a correspondence between subsets in two exemplary discrete-valued datasets consistent with disclosed embodiments. For example, first dataset 410A may represent a corpus of documents in a first language and second dataset 410B may represent a corpus of documents in a second language. Subset 420A may represent words in the first corpus of documents associated with a first latent structure in the first dataset 410A. Subset 420B may represent words in the second corpus of documents associated with a second latent structure in the second dataset 410B. Correspondence 430 may represent a correspondence between the latent structure in the first dataset and the latent structure in the second dataset. For example, the first latent structure in the first dataset may represent a concept in the first language, such as an action, state, relationship, person, place, thing, or idea, and the second latent structure in the second dataset may represent the concept in the second language. Correspondence 430 may indicate a potential equivalence between the words in the first language associated with the first latent structure and the words in the second language associated with the second latent structure. In some embodiments, the systems and/or methods described herein may use that equivalence to improve the accuracy of automatic translation.

Figure 5:
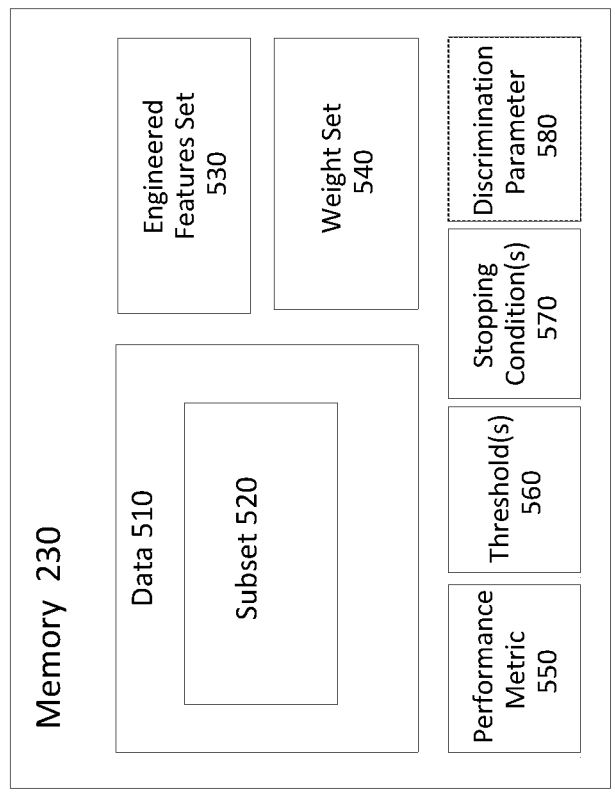
FIG. 5 depicts a block diagram of an exemplary memory component.

FIG. 5 depicts a block diagram of an exemplary memory 230 of device 200 consistent with disclosed embodiments. In some embodiments, memory 230 may contain data 510. In certain embodiments, memory 230 may contain one or more of subset 520, engineered features set (EFS) 530, weights set (WS) 540 performance metric 550, thresholds 560, stopping conditions 570, and discrimination parameter 580. These embodiments are not intended to be limiting. For example, the embodiments described herein may not require every disclosed element of memory 230. In certain embodiments, elements of memory 230 may be combined, divided, modified, or absent. Additionally, elements of memory 230 may be stored in one or more physical memories or represented through a variety of data structures consistent with disclosed embodiments. In various embodiments, device 200 may be configured to receive one or more elements of memory 230, or to derive one or more elements of memory 230 from received data or instructions. In certain embodiments, the received data or instructions may be received using input component 250. In various embodiments, the received data or instructions may be received using communication interface 270. The received data or instructions may be provided by a user or provided by another device in some embodiments. The received data or instructions may be received, for example, from a different process running on device 200.

Device 200 may be configured to store data 510 in memory 230,
consistent with disclosed embodiments. In some embodiments, data 510 may correspond to or represent datasets, such as dataset 310 described above. In certain embodiments, data 510 may correspond to or represent multiple datasets, such as first dataset 410A or second dataset 410B described above. In certain embodiments, data 510 may be stored as one or more data structures, such as matrices, tables, records, or other data structures known to one of skill in the art. As described above with reference to FIG. 1, data 510 may include items and features.

Device 200 may be configured to store subset 520 of data 510 in memory 230, consistent with disclosed embodiments. In certain embodiments, subset 520 may be stored separately from data 510. In further embodiments, subset 520 may be stored as a component of data 510. In some embodiments, subset 520 may be determined prior to application of the systems and/or methods described herein. For example, subset 520 may comprise pre-labeled training data. In certain embodiments, subset 520 may be determined through application of the systems and/or methods described herein to data 510. In certain embodiments, subset 520 may correspond to a latent structure in the dataset. For example, one or more topics, concepts, or associations in data 510 may correspond to subset 520. As a non-limiting example, subset 520 may correspond to a particular programming language, location, person, event, idea, theme, structure, principle, preference, or identity. In some embodiments, application of the systems and/or methods described herein may identify this correspondence.

Device 200 may be configured to store EFS 530 as one or more data structures in memory 230, consistent with disclosed embodiments. In some embodiments, EFS 530 may comprise one or more matrices, tables, databases, or similar data structures known to one of skill in the art. For example, as described in detail with respect to FIG. 7A, EFS 530 may comprise a matrix with columns corresponding to engineered features and rows corresponding to items of data 510.

In some embodiments, EFS 530 may include engineered features. In some aspects, engineered features may correspond to latent structures of data 510. For example, engineered features of EFS 530 may correspond to one or more topics, concepts, or associations present in data 510. As a non-limiting example, one or more engineered features of EFS 530 may correspond to a particular programming language, location, person, event, idea, theme, structure, principle, preference, or identity. In certain aspects, engineered features may comprise linear combinations of the features in data 510. For example engineered features may comprise continuous-valued elements with values reflecting the strength of associations between items in data 510 and latent structures present in data 510.

Device 200 may be configured to store WS 540 as one or more data structures in memory 230, consistent with disclosed embodiments. In some embodiments, WS 540 may comprise matrices, tables, databases, or similar data structures known to one of skill in the art. In some embodiments, WS 540 may comprise weights vectors that associate data 510 with engineered features of EFS 530. As described below with regards to FIG. 7B, in some aspects, the weights vectors may comprise weights elements representing the contribution of features in data 510 to engineered features of EFS 530. These elements may be continuous-valued. The greater the value of the element, the more significant the contribution of the corresponding feature to the engineered feature.

As a non-limiting example, a first engineered feature may concern a philosophical topic while a second engineered feature may concern a computer programming topic. Data 510 may include a feature more typically associated with computer programming, and not philosophy. For example, data 510 may represent a corpus of documents and the feature may be the word "processor." A first weight of WS 540 may include a first element representing the contribution of the feature of data 510 to the first engineered feature. A second weight of WS 540 may include a second element representing the contribution of the computer programming-related feature of data 510 to the second engineered feature. In this non-limiting example, the value of the first element of the first weight may be less than the value of the second element of the second weight.

In the previous example, the first engineered feature was known to concern a philosophical topic and the second engineered feature was known to concern a computer programming topic. Where such associations are originally unknown, the values of elements of WS 540 may provide context for interpreting engineered features of EFS 530. This context may improve the functioning of document retrieval, content retrieval and automatic translation technologies, as well as machine learning tasks, targeted recommendation systems, among other applications recognizable by one of skill in the art. The availability of this context to aid decision-making distinguishes the embodiments described herein over methods that merely apportion of the overall variance of a dataset.

Device 200 may be configured to store performance metric 550 in memory 230, consistent with disclosed embodiments. Performance metric 550 may be stored as one or more instructions, formulas, or rules. In some embodiments, performance metric 550 may define a measure for evaluating the performance of a machine learning task that uses, or is reliant upon, EFS 530. For example, performance metric 550 may describe the accuracy of a classification of a dataset according to EFS 530. As another example, performance metric 550 may describe the accuracy of a translation between a first and a second language using EFS 530 and WS 540. As a further example, when data 510 comprises a corpus of documents, performance metric 550 may describe the relevance of one or more documents retrieved from data 510 based on one or more documents provided or selected. These examples of performance metrics are intended to be non-limiting: one of skill in the art would appreciate the possibility of other such metrics.

Device 200 may be configured to store thresholds 560 in memory 230, consistent with disclosed embodiments. In certain embodiments, thresholds 560 may be stored as one or more data structures in memory 230. In certain embodiments, device 200 may be configured with one or more default values for thresholds 560, or may derive one or more default values for thresholds 560. In some embodiments, device 200 may be configured to define one or more subsets 520 of items in data 510 using thresholds 560 and one or more of EFS 530 and WS 540, as described in greater detail below. In certain embodiments, device 200 may be configured to generate new engineered features of EFS 530 using thresholds 560 and one or more of EFS 530 and WS 540. In various embodiments, device 200 may be configured to define acceptable performance of a machine learning task using thresholds 560 and performance metric 550.

Device 200 may be configured to store stopping conditions 570 in memory 230, consistent with disclosed embodiments. In some embodiments, stopping conditions 570 may comprise one or more conditions. These conditions may be expressed as one or more of non-transitory data and instructions. In some embodiments, device 200 may be configured to manage a balance between accurate, complete determination of a dataset structure and computation resource requirements using stopping conditions 570.

Stopping conditions 570 may comprise set generation conditions and feature generation conditions, consistent with disclosed embodiments. Set generation conditions may affect the overall size of EFS 530 and WS 540. In some aspects, device 200 may be configured to cease generating additional engineered features and weights vectors when one or more set generation conditions is satisfied. In certain aspects, set generation conditions may concern a number of engineered features or weights vectors. For example, device 200 may be configured to generate engineered features until EFS 530 includes a number of engineered features, or generate weights vectors until WS 540 includes a number of weights vectors. In some aspects, the number may be predetermined. In certain aspects, device 200 may be configured to determine the number during processing of data 510 (or subset 520). As a non-limiting example, the number may be based on one or more of the data 510 (or subset 520), the existing EFS 530, and the existing WS 540.

In various aspects, set generation conditions may concern a period of time. For example, device 200 may be configured to generate engineered features, or generate weights vectors, until a period of time expires. In some aspects, the period of time may be predetermined. In certain aspects, device 200 may be configured to determine the period of time during processing of data 510 (or subset 520). As a non-limiting example, the period of time may be based on one or more of the data 510 (or subset 520), the existing EFS 530, and the existing WS 540.

In some aspects, set generation conditions may concern a metric. As used herein, a metric may include a function of the Euclidean distance, such as a squared Euclidean distance; a standardized Euclidean distance, a Manhattan distance; a Minkowski distance; a Chebychev distance; a Mahalanobis distance; a cosine distance calculated as one minus the cosine of the included angle between the first engineered features; a correlation distance calculated as one minus the sample correlation between the first engineered features; a Spearman distance calculated as one minus the sample's Spearman's rank correlation between the first engineered features; a hamming distance; a Jaccard distance calculated as one minus the Jaccard coefficient; a distance metric based on a measure of mutual information; or similar metric known to one of skill in the art.

In some embodiments, device 200 may be configured to iteratively generate engineered features and calculate a value for the metric. The value for the metric may depend on one or more of EFS 530 and WS 540. In some aspects, device 200 may be configured to generate engineered features until the value for the metric satisfies one or more set generation conditions. For example, a set generation condition may be satisfied when the magnitude of the value of the metric falls below an absolute or relative value. In certain aspects, device 200 may be configured to generate engineered features until a change in the value for the metric satisfies one or more set generation conditions. For example, a set generation condition may be satisfied when the magnitude of the change in the value of the metric between iterations falls below an absolute or relative value. In some aspects, the value of the metric may be predetermined. In certain aspects, device 200 may be configured to determine the value of the metric during processing of data 510 (or subset 520). As a non-limiting example, the value of the metric may be based on one or more of the data 510 (or subset 520), the existing EFS 530, and the existing WS 540.

In some aspects, set generation conditions may concern a performance function. Device 200 may be configured to perform a task using one or more of EFS 530 and WS 540. In certain embodiments, the task may be a machine learning task. The performance function may describe an outcome of the task. For example, performance function may concern the accuracy of automatic machine translation. As an additional example, the performance function may concern the relevance of documents retrieved using an automatic recommendation system. The performance function may concern the performance of device 200, or another device, at the task.

In some aspects, device 200 may be configured to generate engineered features until a value for the performance function satisfies one or more set generation conditions. For example, a set generation condition may be satisfied when the magnitude of the value of the performance function falls below an absolute or relative value. In certain aspects, device 200 may be configured to generate engineered features until a change in the value for the performance function satisfies one or more set generation conditions. For example, a set generation condition may be satisfied when the magnitude of the change in the value of the performance function between iterations falls below an absolute or relative value. In some aspects, this value of the performance function may be predetermined. In certain aspects, device 200 may be configured to determine the value of the performance function during processing of data 510 (or subset 520). As a non-limiting example, the value of the performance function may be based on one or more of the data 510 (or subset 520), the existing EFS 530, and the existing WS 540.

As described above, stopping conditions 570 may comprise feature generation conditions. Feature generation conditions may affect the precision of engineered features and weights vectors. For example, as described with regards to FIGS. 7A, 7B, and 8, device 200 may iteratively calculate each engineered feature. In certain aspects, device 200 may be configured to cease calculating an engineered feature when one or more feature generation conditions are satisfied.

In some aspects, feature generation conditions may concern a metric and/or performance function. Device 200 may be configured to iteratively update an engineered feature based on weights vectors, and then update the weights vectors based on the updated engineered feature. Device 200 may be configured to calculate each iteration a value of the metric and/or performance function, until this value satisfies one or more set generation conditions. For example, a set generation condition may be satisfied when the magnitude of the value falls below an absolute or relative value. Device 200 may be configured to calculate each iteration a value of the metric and/or performance function, until a change in this value satisfies one or more set generation conditions. For example, a feature generation condition may be satisfied when the magnitude of the change in the value between iterations falls below an absolute or relative value. In some aspects, the value may be predetermined. In certain aspects, device 200 may be configured to determine the value during processing of data 510 (or subset 520). As a non-limiting example, the value of the metric and/or performance function may be based on one or more of the engineered feature and the weights vectors.

In some aspects, feature generation conditions may concern a number of iterations. For example, device 200 may be configured to iteratively update an engineered feature a number of times. In some aspects, the number may be predetermined. In certain aspects, device 200 may be configured to determine the number during processing of data 510 (or subset 520). As a non-limiting example, the number may be based on one or more of the data 510 (or subset 520), the existing EFS 530, and the existing WS 540.

In various aspects, feature generation conditions may concern a period of time. For example, device 200 may be configured to iteratively update an engineered feature until a period of time expires. In some aspects, the period of time may be predetermined. In certain aspects, device 200 may be configured to determine the period of time during processing of data 510 (or subset 520). As a non-limiting example, the period of time may be based on one or more of the data 510 (or subset 520), the existing EFS 530, and the existing WS 540.

Device 200 may be configured to store discrimination parameter 580 in memory 230, consistent with disclosed embodiments. Device 200 may be configured to use discrimination parameter 580 in determining weights vectors of WS 540. Higher values for discrimination parameter 580 will emphasize differences between features in data 510: more engineered features may be required to describe the latent structure and the latent structure may be characterized with greater selectivity. Lower values for discrimination parameter 580 will de-emphasize differences between features in data 510: fewer engineered features may be required and the latent structure may be characterized with less selectivity. In certain aspects, the value of discrimination parameter 580 may be selected from the range of 1 to 20. In various aspects, the value of discrimination parameter 580 may be selected from the range of 2 to 10. In some embodiments, values for discrimination parameter 580 may vary between subsets 520 and between engineered features of EFS 530 when analyzing discrete data 510.

Figure 6:
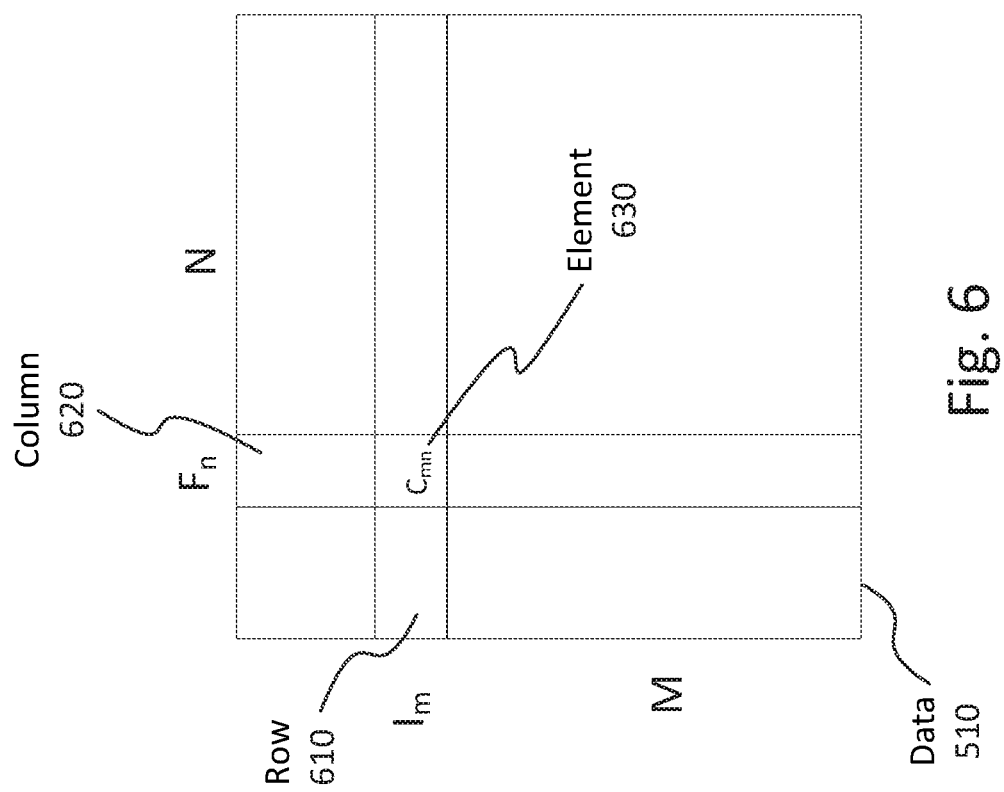
FIG. 6 depicts an exemplary representation of a discrete-valued dataset.

FIG. 6 depicts an exemplary representation of data 510 consistent with disclosed embodiments. In some embodiments, data 510 may include M items and N features. As described above with reference to FIG. 3, items may correspond to distinguishable objects having distinguishable characteristics, and features may correspond to the distinguishable characteristics of the overall set of items.

Device 200 may be configured to store data 510 as a matrix, consistent with disclosed embodiments. In certain embodiments, items may correspond to a first dimension of the matrix and features may correspond to a second dimension of the matrix. For example, items may correspond to the rows 610 of the matrix and features may correspond to the columns 620 of the matrix. As described above with reference to FIG. 5, the elements 630 of the matrix may be discrete-valued. The value of matrix element 630 may be an integer. In certain embodiments, the value of the matrix element $C_{mn}$ (630) may indicate the presence or absence of the corresponding feature $F_n$ in the item $I_m$. In various embodiments, the value of the matrix element $C_{mn}$ (630) may indicate a categorical value, such as type of color or a day of the week, for corresponding feature $F_n$ of item $I_m$. One of ordinary skill in the art would appreciate that the disclosed relationships between items and features could be realized using alternative data structures and that the disclosed embodiments are not intended to be limiting.

FIG. 7A depicts an exemplary representation of an engineered feature 710 (labeled $EF_i$), one of EFS 530. As described above, EFS 530 may comprise a matrix in some embodiments. In some aspects, engineered features may correspond to one dimension of EFS 530. For example, engineered features (e.g., engineered feature 710) may correspond to columns of EFS 530. As and additional example, engineered feature 710 may correspond to the $i^{th}$ column of EFS 530.

Engineered feature 710 may include engineered element 730, consistent with disclosed embodiments. Engineered element 730 may correspond to an item in data 510 (e.g., item $I_m$). Engineered element 730 may be a member of the $m^{th}$ row of EFS 530 and may also correspond to the $m^{th}$ item in data 510. Engineered element 730 may be continuous-valued. The magnitude of engineered element 730 may represent the strength of the association between engineered feature 710 and the $m^{th}$ item in data 510.

FIG. 7B depicts an exemplary representation of a weights vector 720 (labeled $W_i$). As described above, WS 540 may comprise a matrix in some embodiments. In some aspects, weights vectors may correspond to one dimension of WS 540. For example, weights vectors (e.g., weights vector 720) may correspond to rows of WS 540. As an additional example, weights vector 720 may correspond to the $i^{th}$ row of WS 540.

Weights vector 720 may include weight element 740, consistent with disclosed embodiments. Weight element 740 may correspond to a feature in data 510 (e.g., feature $F_n$). For example, weight element 740 may be a member of the $n^{th}$ column of WS 540 and may also correspond to the $n^{th}$ feature in data 510. Weight element 740 may be continuous-valued. In some embodiments, weights vector 720 may correspond to engineered feature 710. In certain embodiments, the magnitude of weight element 740 may represent the contribution of $n^{th}$ feature in data 510 to engineered feature 710.

Figure 8:
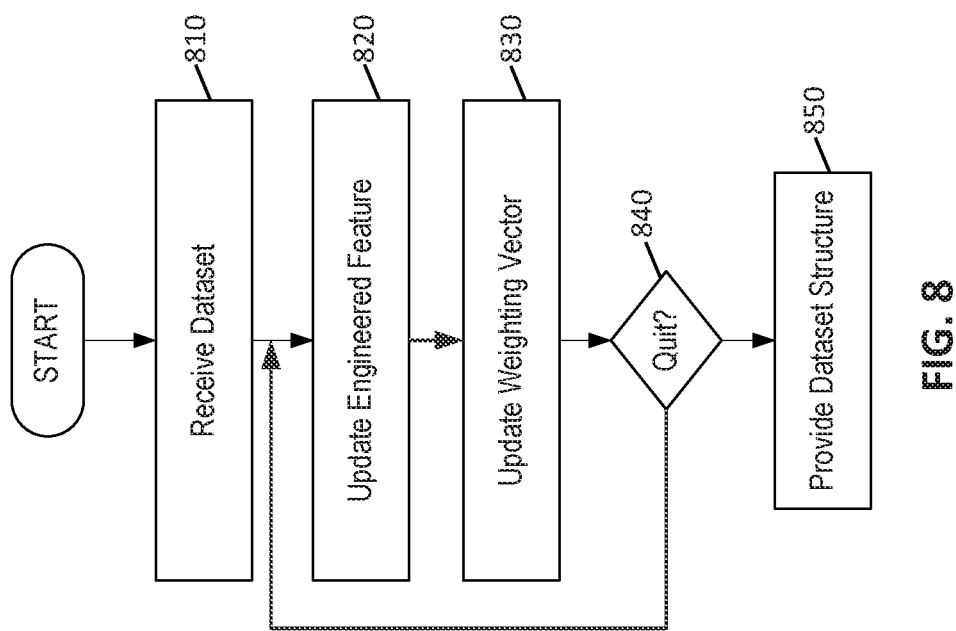
FIG. 8 depicts a flowchart of an exemplary method for determining engineered features and weights vectors.

FIG. 8 depicts a flowchart of an exemplary method for determining engineered features and weights vectors consistent with disclosed embodiments. Device 200 may be configured to receive a dataset (step 810). In certain embodiments, the dataset may be received using input component 250. In various embodiments, the dataset may be received using communication interface 270. The dataset may be provided by a user, or provided by another device. The dataset may be received, for example, from another program on device 200. Receiving the dataset may include deriving the dataset using received data or instructions in certain aspects. Consistent with disclosed embodiments, the dataset may include some or all of data 510, and may include subset 520. As described above with respect to FIG. 5, subset 520 may correspond to pre-labeled data. For example, subset 520 may comprise training data. As an example, subset 520 may be pre-identified with a specific topic, concept, or association in data 510. In certain embodiments, the dataset may include all of data 510.

Consistent with disclosed embodiments, device 200 may be configured to iteratively update engineered feature 710 (step 820) and weights vector 720 (step 830). In some embodiments, device 200 may be configured to initialize weights vector 720. In certain embodiments, device 200 may be configured to select at least one weights element of weights vector 720, such as weight element 740, and set the selected at least one weights element to a non-zero value. This selection may be random or deterministic. A plurality of weights elements of weights vector 720 may be set to non-zero values. The non-zero values may vary between elements in the plurality of weights elements. Device 200 may be configured to update engineered feature 710 based on the existing weights vector 720, then update weights vector 720 based on the updated engineered feature 710. In some embodiments this order may be reversed. As described above with respect to FIG. 7A, each element of engineered feature 710 may correspond to an item in data 510. As described above with respect to FIG. 7B, each element of weights vector 720 may correspond to a feature in data 510. In certain embodiments, the value of engineered element 730 of engineered feature 710 that corresponds to an item $I_m$ may depend on weights vector 720 and the value $F_{nm}$ of the $n^{th}$ feature for item $I_m$. In various embodiments, this relationship may be expressed as in equation (1) below:

$$EF_{im} = \sum_{n=1}^{N} W_n F_{nm} \quad (1)$$

where $EF_{im}$ is the $m^{th}$ element of engineered feature 710 ($EF_i$), $W_n$ is the $n^{th}$ element of the weights vector 720, and $F_{nm}$ is the value of the $n^{th}$ feature of the $m^{th}$ item. In various embodiments, the value of weight element 740 of weights vector 720 that corresponds to feature $F_n$ may be a function of engineered feature 710 and feature $F_n$, as shown in equation (2) below:

$$W_n = J(EF_i, F_n) \quad (2)$$

In some embodiments, $J(EF_i, F_n)$ may be a function of the discrimination parameter 580. In certain embodiments, $J(EF_i, F_n)$ may be a function of the statistical dependence between engineered feature 710 and the value of the $n^{th}$ feature $F_n$. For example, $J(EF_i, F_n)$ may be a function of $M(EF_i, F_n)$, a normalized measure of the mutual information of $EF_i$ and $F_n$, as shown in equation (3) below:

$$M(EF_i, F_n) = \frac{I(EF_i, F_n)}{\max(I(EF_i, EF_i), I(F_n, F_n))} \quad (4)$$

where $corr(EF_i, F_n)$ is a measure of the correlation between the discrete-valued engineered feature 710 and the discrete-valued feature $F_n$. In other embodiments, $J(EF_i, F_n)$ may be zero if $corr(EF_i, F_n)$ is less than zero. In certain embodiments, $J(EF_i, F_n)$ may depend on conditions other than the discrete-valued engineered feature 710 and the discrete-valued feature $F_n$. The normalized measure of mutual information may depend on the total information contained in one or more of engineered feature 710 and discrete-valued feature $F_n$. For example, as shown in equation (4) below:

$$J(EF_i, F_n) = \begin{cases} M(EF_i, F_n)^\delta & corr(EF_i, F_n) \geq 0 \\ -M(EF_i, F_n)^\delta & corr(EF_i, F_n) < 0 \end{cases} \quad (3)$$

where $I(EF_i, F_n)$ is the mutual information of discrete-valued engineered feature 710 and the discrete-valued feature $F_n$. As known to one of skill in the art, mutual information may measure the mutual dependence of two random variables. For example, mutual information may describe the similarity between the joint distribution of two random variables and the product of the marginal distribution of each random variable. As would be understood by one of skill in the art, the particular form of these equations is not intended to be limiting.

Device 200 may be configured to continue updating engineered feature 710 and weights vector 720 until feature generation conditions are satisfied, consistent with disclosed embodiments (step 840). As described above with reference to FIG. 5, feature generation conditions may depend on a metric, a performance function, a number of iterations, or a period of time. In some aspects, feature generation conditions may also depend on similar criteria, as would be recognized by one of skill in the art.

Device 200 may be configured to continue adding engineered features to EFS 530 and weights vectors to WS 540 until set generation conditions are satisfied. As described above with reference to FIG. 5, set generation conditions may depend on a metric, a performance function, a number of iterations, or a period of time. In some aspects, set generation conditions may also depend on similar criteria, as would be recognized by one of skill in the art.

Device 200 may be configured to determine the additional features and weights vectors by varying the initialization of weights vector 720. In some aspects, this initialization may be random. For example, device 200 may be configured to initialize a new weights vector with random weight element values. In certain aspects, this initialization may be deterministic. For example, device 200 may be configured to initialize a new weights vector based on the existing WS 540. For example, device 200 may be configured to determine insignificant features of data 510 that do not significantly contribute to existing engineered features of EFS 530. This determination may depend on the existing WS 540 and thresholds 560.

For example, device 200 may be configured to determine features of data 510 with corresponding weight elements in WS 540 greater than a threshold value in thresholds 560. Device 200 may be configured to identify the remaining features as insignificant features. In some aspects, device 200 may be configured to generate a new weights vector using the identified insignificant features of data 510. For example, device 200 may be configured to initialize to non-zero values one or more weight elements of the new weights vector corresponding to the identified insignificant features. In some aspects, the remaining weights elements may be set to zero.

Device 200 may be configured to provide a structure of data 510, consistent with disclosed embodiments (step 850). For example, device 200 may be configured to provide one or more engineered features of EFS 530 (e.g., engineered feature 710). As an additional example, device 200 may be configured to provide one or more weights vectors of WS 540 (e.g., weights vector 720). In a further example, device 200 may be configured to provide features of the data 510 (or the subset 520) significantly contributing to one or more of the output engineered features of EFS 530. In some embodiments, device 200, or another similar device, may be configured to use the provided structure of data 510 to improve the functioning of a machine learning task. In certain embodiments, the provided weights vectors of WS 540 and significantly contributing features of data 510 may provide context for interpreting the provided engineered features of EFS 530.

Figure 9:
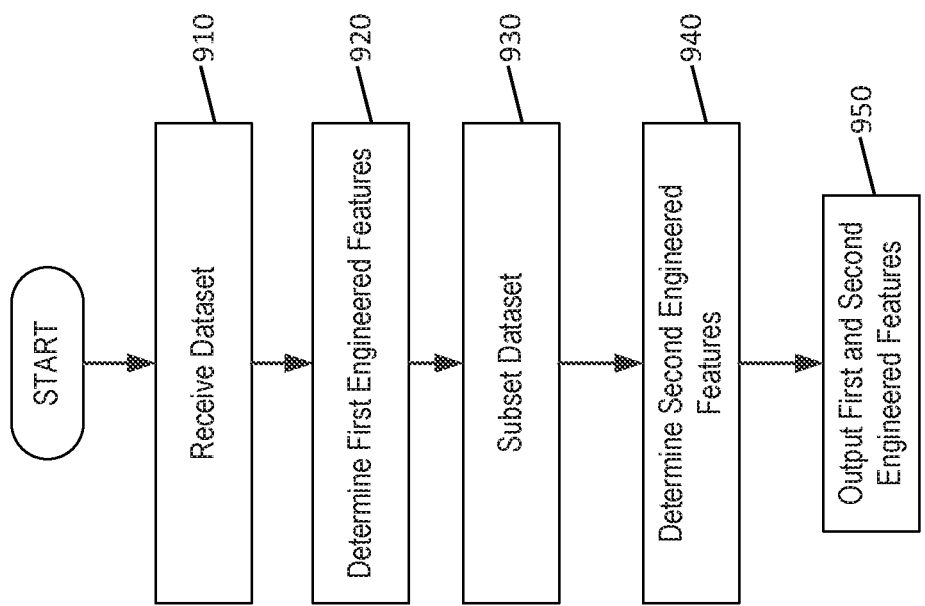
FIG. 9 depicts a flowchart of an exemplary method for determining engineered features that characterize a dataset.

FIG. 9 depicts a flowchart of an exemplary method for determining EFS 530 that characterizes a dataset consistent with disclosed embodiments. In some embodiments, device 200 may be configured to receive the dataset (step 910). The dataset may be received, for example, using input component 250 or communication interface 270. The dataset may be provided by a user, or provided by another device. The dataset may be received, for example, from another program on device 200. Receiving the dataset may include deriving the dataset using received data or instructions. The dataset may include some or all of data 510, and may include subset 520.

Device 200 may be configured to determine first engineered features, consistent with disclosed embodiments (step 920). As described above with reference to FIGS. 7A, 7B and 8, device 200 may be configured to determine first engineered features using data 510, weights vectors, stopping conditions 570, and discrimination parameter 580. In certain embodiments, device 200 may be configured to generate multiple first engineered features by varying initialization conditions. For example, different first engineered features may be determined by initializing to non-zero values different weights elements (such as weight element 740) or patterns of weights elements. As described above, this differing initialization may be performed deterministically or randomly. In some embodiments, device 200 may be configured to receive first engineered features. In certain embodiments, device 200 may be configured to store first engineered features in memory 230, and/or retrieve first engineered features from memory 230.

Device 200 may be configured to use the first engineered features to subset data 510 to generate subset 520, consistent with disclosed embodiments (step 930). Processing only subset 520 may increase accuracy of determined features by restricting further processing to areas of related content and by excluding potentially confounding features or items from further analysis. Restricting processing to subset 520 may also dramatically increase the speed of processing data 510, thereby permitting the analysis of large discrete datasets that might otherwise not be tractable. The disclosed systems and methods may also be formulated in a map/reduce framework, permitting convenient use of existing distributed computing resources.

In some embodiments, device 200 may be configured to subset data 510 using thresholds 560. In certain aspects, device 200 may be configured to include one or more items and features from data 510 in subset 520 using thresholds 560 and one or more of an engineered feature (e.g., engineered feature 710) and weights vectors (e.g., weights vector 720). For example, device 200 may be configured to include features from data 510 in subset 520 when weights elements (e.g., weight element 740) corresponding to the features have values exceeding one of thresholds 560. As an additional example, device 200 may be configured to include items from data 510 in subset 520 when engineered elements (e.g., engineered element 730) corresponding to the items have values exceeding one of thresholds 560. As would be recognized by one of skill in the art, device 200 may be similarly configured to exclude one or more items or features in data 510 from subset 520.

In some embodiments, device 200 may be configured to subset data 510 using clustering. In certain aspects, device 200 may be configured to cluster data 510 based on the values of first engineered features. A non-limiting example, device 200 may be configured to cluster data 510 using a known clustering algorithm such as PAM, K-means, CLARA, or CLARANS. In some aspects, device 200 may be configured to select one or more of the clusters as subset 520, consistent with disclosed embodiments. In certain aspects, device 200 may be configured to select subset 520 based on selection input received from a user, or provided by another device. Device 200 may be configured to receive the selection input using input component 250. For example, the selection input may be received using communication interface 270. As would be recognized by one of skill in the art, clustering may provide an additional, useful method for selecting subsets of data 510 for additional processing. For example, clustering may enable selection of items that are "similar" with regards to multiple engineered features. For example, clustering a corpus of philosophical works according to first engineered features associated with the concepts of "truth," "prediction," and "effect," may group works by Charles Sanders Peirce together with those of John Dewey, and apart from those of Plato.

Device 200 may be configured to determine second engineered features using subset 520, consistent with disclosed embodiments (step 940). As described above with reference to FIGS. 7A, 7B and 8, device 200 may be configured to determine second engineered features using subset 520, weights vectors, stopping conditions 570, and discrimination parameter 580. In certain embodiments, device 200 may be configured to generate multiple second engineered features by varying initialization conditions. For example, different second engineered features may be determined by initializing to non-zero values different weights elements (e.g. weight element 740) or patterns of weights elements. As described above, this differing initialization may be performed deterministically or randomly. In some embodiments, device 200 may be configured to receive second engineered features. In certain embodiments, device 200 may be configured to store second engineered features in memory 230, and/or retrieve second engineered features from memory 230.

Device 200 may be configured to output a structure of the data 510 consistent with disclosed embodiments (step 950). As described above with reference to FIG. 8, device 200 may be configured to provide one or more engineered features of EFS 530. For example, device 200 may be configured to provide one or more of the first engineered features and the second engineered features. As a further example, device 200 may be configured to provide one or more weights vectors of WS 540. These weights vectors may correspond to the provided first engineered features and second engineered features. In some embodiments, device 200, or another device, may be configured to use one or more of first engineered features and second engineered features when subsequently processing data 510 (even though device 200 derived second engineered features only using subset 520).

Figure 10:
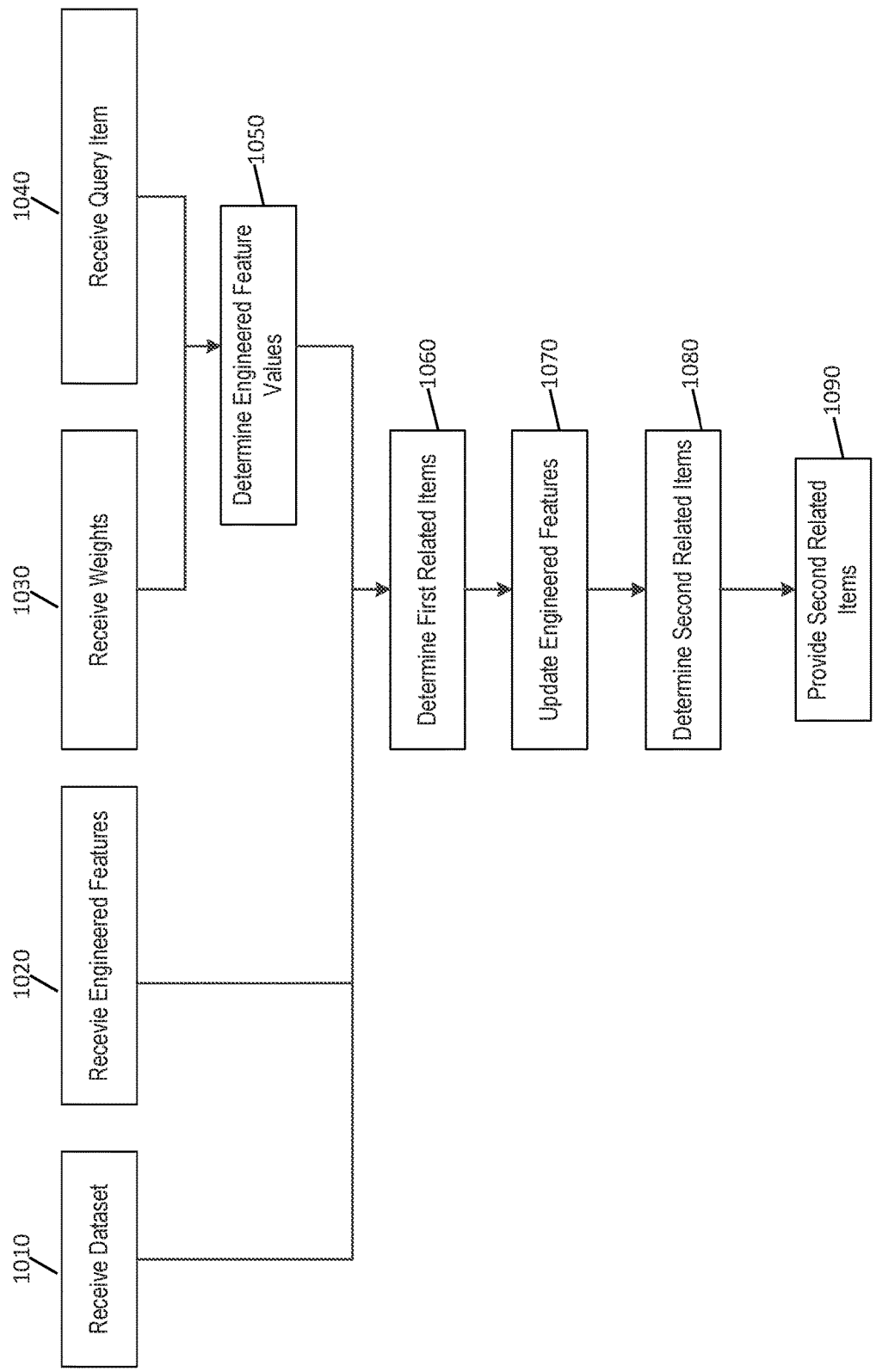
FIG. 10 depicts a flowchart of an exemplary content retrieval method.

FIG. 10 depicts a flowchart of an exemplary method for providing items in a first dataset similar to a query item, consistent with disclosed embodiments. In some embodiments, device 200 may be configured to provide items in data 510 (or subset 520) in response to receiving the query item. The provided items may be related to the received query item, as described below. As a first non-limiting example, the query item may be a patent specification and device 200 may include a database of patent applications. Device 200 may be configured to provide items similar to the patent specification in response to receiving the query item. As a second non-limiting example, the query item may represent or be associated with content, such as a product or service; device 200 may be a content server or a content referral server. Device 200 may be configured to provide content items similar to the query item in response to receiving the query item.

In some embodiments, device 200 may be configured to receive a dataset, such as data 510 (or subset 520) (step 1010). In certain embodiments device 200 may be configured to receive EFS 530 (step 1020). Device 200 may be configured to receive WS 540 corresponding to EFS 530 (step 1030). Device 200 may be configured to receive a query item (step 1040). One or more of the dataset, EFS 530, WS 540, and query item may be received using input component 250 or using communication interface 270. One or more of the dataset, EFS 530, WS 540, and query item may be provided by a user, device 200, or another similar device. One or more of the dataset, EFS 530, WS 540, and query item may be received, for example, from another program on device 200. According to embodiments disclosed herein, receiving one or more of the dataset, EFS 530, WS 540, and query item may encompass deriving one or more of the dataset, EFS 530, WS 540, and query item using received data or instructions. One or more of the dataset, EFS 530, WS 540, and query item may be received at different times or at the same time.

Device 200 may be configured to determine engineered feature values for the query item, consistent with disclosed embodiments (step 1050). For example, the items of data 510 may represent documents. The features of data 510 may represent words. The elements of data 510 (or subset 520) may indicate the presence or absence of a particular word in a particular document. The query item may be a collection of words. Device 200 may be configured to construct discrete values indicating the presence or absence in the query item of each word in data 510 (or subset 520). Device 200 may be configured to determine, based on the discrete values and EFS 530, engineered feature values for the query item each one of EFS 530. For example, device 200 may be configured to calculate engineered feature values according to equation (1) above, using the discrete values in place of $F_{nm}$. In certain embodiments, device 200 may be configured to receive engineered feature values through input component 250 or communication interface 270. In some embodiments, device 200 may be configured to store the engineered feature values in memory 230.

Device 200 may be configured to determine first related items based on EFS 530 and the engineered feature values, consistent with disclosed embodiments (step 1060). As described above with reference to FIG. 7A, in some embodiments EFS 530 may comprise columns corresponding to engineered features 710 and rows corresponding to items in data 510 (or subset 520). Device 200 may be configured to determine first related items by comparing rows of EFS 530 with the engineered feature values determined for the query item in step 1050.

Device 200 may be configured to base this comparison on a metric, consistent with disclosed embodiments. In some aspects, device 200 may be configured to calculate values of the metric based on the engineered feature values and the rows of EFS 530. Device 200 may be configured to identify items as first related items when the calculated value of the metric is less than a threshold value. This value may be an absolute or relative value. For example, items associated with a distance of less than 10% of the maximum distance according to the metric may be identified as first related items. In some aspects, this value may be predetermined. In certain aspects, device 200 may be configured to determine the value during processing of data 510 (or subset 520).

Device 200 may be configured to calculate updated engineered features consistent with disclosed embodiments (step 1070). Calculating updated engineered features may comprise providing first outputs, receiving indications to update engineered features, and updating engineered features based on the received indications.

Consistent with disclosed embodiments, device 200 may be configured to provide the first outputs to a user, for example, through output component 260, and/or communication interface 270. In some aspects, device 200 may be configured to provide the first outputs to another device. In other aspects, device 200 may be configured to provide the first outputs as input to another process, program, or process step of device 200.

In some embodiments, first outputs may include first related items. In certain embodiments, first outputs may include context for identifying the topics, concepts, or associations driving selection of the first related items. For example, first outputs may include one or more weights vectors of WS 540. As an additional example, first outputs may include one or more engineered features of EFS 530. As a further example, first outputs may include features of data 510 (or subset 520). In certain embodiments, device 200 may be configured to provide one or more significant engineered features. These significant engineered features may be characterized by extreme values of engineered element 730, such as values of engineered element 730 exceeding an absolute or relative threshold. Device 200 may be configured to provide significant features of data 510 (or subset 520). These significant features may be characterized by extreme values of weight element 740, such as values of weight element 740 exceeding an absolute or relative threshold. By considering the significant engineered features and the significant features of the data 510, the topics, concepts, or associations driving selection of the first related items may be identified.

For example, when the query item is a patent, the features may be words in the specification. Engineered features may correspond to technologies or applications. The first related items may include first related patents similar to the query patent. Significant engineered features may correspond to technologies or applications common to the query patent and the first related patents. These technologies or applications may be identified with reference to the significant features of the dataset—words in the specification strongly associated with each significant engineered feature.

Consistent with disclosed embodiments, device 200 may be configured to receive indications to update engineered features. In some embodiments, the indications may concern adjusting the contribution of one or more features of data 510 (or subset 520). In some embodiments, an indication may signal that the values of the weight element 740 corresponding to one or more features of data 510 (or subset 520) should be decreased. For example, an indication may signal that the contribution of one or more features of data 510 (or subset 520) to an engineered feature of EFS 530 should be eliminated. When the query item is a document and the features of data 510 are words, such a signal may indicate that certain words may have been incorrectly identified as having relevance, perhaps because these words were used in a different sense in the query item than in the first related items. Similarly, in certain embodiments, the contribution of the indicated features may be increased, for example when a word has been incorrectly identified as having little significance. In some embodiments, the indications may concern merely adjusting the contribution of certain words to the one or more engineered features of EFS 530.

Device 200 may be configured to update EFS 530 based on the received indications, consistent with disclosed embodiments. In some embodiments, device 200 may be configured to update WS 540 based on the received indications. For example, device 200 may receive an indication that the contribution of feature $F_n$ of data 510 (or subset 520) to engineered feature 710 of EFS 530 should be adjusted. Device 200 may be configured to, in response, update weights vector 720. For example device 200 may be configured to update weight element 740 corresponding to feature $F_n$ of data 510 (or subset 520). When the indication signals that the contribution of feature $F_n$ to engineered feature 710 of EFS 530 should be reduced, device 200 may be configured to scale weight element 740 by a number on the interval [0, 1). When the indication signals that contribution of feature $F_n$ to engineered feature 710 of EFS 530 should be increased, device 200 may be configured to scale weight element 740 by a number greater than 1. Device 200 may be configured to then recalculate engineered features of EFS 530 based on the updated weights vectors according to equation (1).

Consistent with disclosed embodiments, in step 1080, device 200 may be configured to determine second related items using the updated engineered features of EFS 530. In certain embodiments, device 200 may be configured to determine second related items as described above regarding first related items in step 1060. Consistent with disclosed embodiments, in step 1090, device 200 may be configured to provide the second related items. In certain embodiments, device 200 may be configured to provide the second related items as described above regarding first related items in step 1070. As would be recognized by one of skill in the art, steps 1070-1090 may be iterated until a satisfactory result is achieved.

Figure 11:
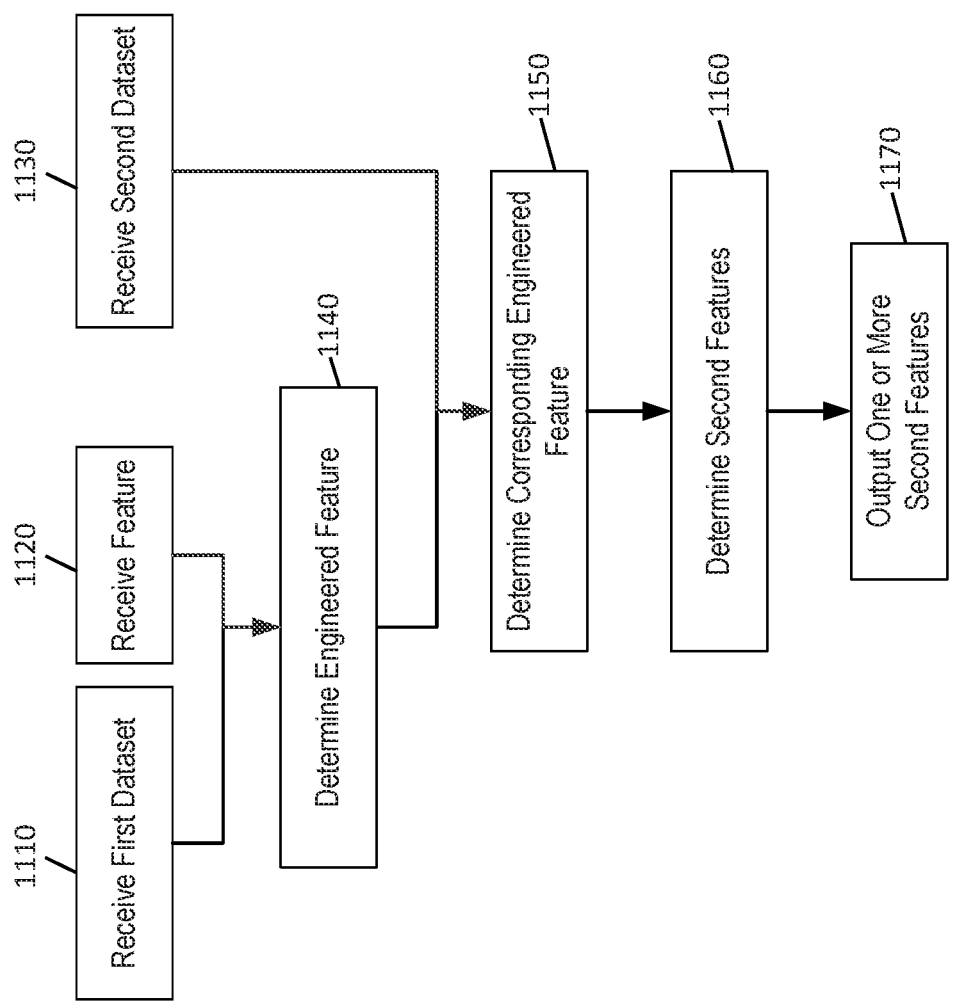
FIG. 11 depicts a flowchart of an exemplary automatic translation method.

FIG. 11 depicts a flowchart of an exemplary method for providing response items of a second dataset (e.g., second dataset 410B) similar to a query item of a first dataset (e.g., first dataset 410A), consistent with disclosed embodiments. In some aspects, device 200 may be configured to receive the first dataset (step 1110). In some implementations, first dataset may comprise a first term-document matrix. For example, the rows of the first dataset may correspond to documents in a first corpus. The columns of the first dataset may correspond to words in the document in the first corpus. In some aspects, the elements of the first dataset may indicate the presence or absence of a word in a document of the first corpus. In certain aspects, the elements of the first dataset may indicate the number of times a word appears in a document of the first corpus. In certain embodiments, device 200 may also be configured to receive first engineered features and weights vectors for the first dataset. In some embodiments, device 200 may be configured to determine first engineered features and weights vectors for the first dataset as described above with respect to FIG. 8.

Device 200 may be configured to receive the second dataset (step 1130), consistent with disclosed embodiments. In some implementations, the second dataset may comprise a second term-document matrix. For example, the rows of the second dataset may correspond to documents in a second corpus. The columns of the second dataset may correspond to words in the document in the second corpus. In some aspects, the elements of the second dataset may indicate the presence or absence of a word in a document of the second corpus. In certain aspects, the elements of the second dataset may indicate the number of times a word appears in a document of the second corpus. In certain embodiments, device 200 may also be configured to receive second engineered features and weights vectors for the second dataset. In some embodiments, the first corpus may comprise documents in a first language and the second corpus may comprise documents in a second language differing from the first language. In certain embodiments, device 200 may also be configured to receive second engineered features and weights vectors for the second dataset. In some embodiments, device 200 may be configured to determine second engineered features and weights vectors for the second dataset as described above with respect to FIG. 8. In certain embodiments device 200 may be configured to receive an indication of a first feature of the first dataset (step 1120). This indication may be configured to cause device 200 to provide one or more second features from the second dataset (or subset 520) related to the indicated first feature. For example, the first feature may be one or more words in a first language and the second features may be one or more words in a second language.

Device 200 may receive the datasets, engineered features, weights vectors, and the indication of the first feature using input component 250, consistent with disclosed embodiments. In various embodiments, these data structures and indications may be received using communication interface 270. One or more of these data structures and indications may be provided by a user, device 200, or another device. One or more of these data structures and indications may be received, for example, from a separate process running on device 200. Receiving one or more of these data structures and indications may include deriving one or more of them using received data or instructions. These data structures and indications may be received at different times, or at the same time.

Device 200 may be configured to determine a first engineered feature for the first dataset associated with the first feature, consistent with disclosed embodiments (step 1140). In some embodiments, this association may be based on the value of the weights vectors corresponding to the first feature. In various embodiments, the first feature may be associated with the first engineered feature to which it makes the greatest contribution, according to the weights vectors.

Device 200 may be configured to determine an engineered feature for the second dataset based on the engineered feature for the first dataset (step 1150) consistent with disclosed embodiments. In some embodiments, device 200 may be configured to store correspondences (e.g. correspondence 430) between second engineered features of the second dataset and the first engineered feature of the first dataset. Device 200 may be configured to store these correspondences as a data structure in memory 230. Device 200 may be configured to determine the engineered features in the second dataset based on the engineered feature in first dataset based on these stored correspondences.

In some aspects, these stored correspondences may reflect common latent structures associated with both the engineered features for the first dataset and the engineered features for the second dataset. A common latent structure may include an organizing topic, concept, or association common present in both the first dataset and the second dataset. As a non-limiting example, the concept of moral virtue may be associated with a first engineered feature for a first corpus of documents and a second engineered feature for a second corpus of documents. When the first corpus of documents is in Greek, the Greek word "arête" may significantly contribute to the first engineered feature. When the second corpus of documents is in Chinese, the Chinese word "dé" may significantly contribute to the second engineered feature. As described above, device 200 may be configured to store a correspondence between the first engineered feature of the Greek corpus and the second engineered feature of the Chinese corpus.

Device 200 may be configured to determine second features in the second dataset, consistent with disclosed embodiments (step 1160). In some embodiments, device 200 may be configured to determine the second features in the second dataset using the determined engineered features for the second dataset from step 1150. In some aspects, device 200 may be configured to determine these second features based on the weights vectors for the determined engineered features for the second dataset. For example, device 200 may be configured to determine the second features as those with contributions to the determined second engineered feature exceeding a threshold.

Device 200 may be configured to output one or more second features, consistent with disclosed embodiments (step 1170). In some embodiments, device 200 may be configured to provide one or more of the second features, the corresponding weights vectors for the second engineered features, and an indication of the second engineered feature to a user or as an input to another process, program, or program step of device 200.

Exemplary Implementation: Document Retrieval

For example, a user may request documentation relating to a particular programming language and a particular problem, concept, or term in that programming language. This documentation may be requested from a large collection of documents concerning multiple programming languages and an expansive collection of topics.

For example, the collection of documents may be the contents of the Stack Exchange Data Dump, a record of two years of user activity for the Stack Overflow question and answer website. The Stack Overflow website provides a forum for users to post questions and answers concerning programming topics. The Stack Exchange Data Dump corpus includes over 800,000 questions, 2 million answers, and nearly three million comments concerning a wide range of programming concepts.

Principal components analysis would generate features accounting for the variability between documents in the collection, but these features may not be easily interpretable. Furthermore, the complexity of this analysis would be $O(m^2n+m^3)$, where m is the number of features and n is the number of documents.

The proposed methods and systems could generate interpretable engineered features suitable for retrieving relevant documents from the Stack Overflow corpus. Weights vectors could associate important features with each engineered feature. These important features provide context for interpreting the engineered features. The complexity of the proposed systems and methods would be less than $O(n^2)$. Furthermore, the proposed methods and systems permit application of existing map/reduce frameworks to the data, increasing scalability.

For example, device 200 may process the StackExchange corpus into a term-document matrix (e.g. data 510), with rows (e.g. row 610) corresponding to documents in the StackExchange corpus and columns (e.g. columns 620) corresponding to words (i.e. features) in the corpus. One column may correspond to the word "mod_log_config," the name of an Apache HTTP Server module that provides for flexible logging of client requests. To construct an engineered feature for identifying documents related to this module, device 200 may be configured to initialize every weight element (e.g. weight element 740) in the weights vector (e.g. weights vector 720) to zero, except for the weight element corresponding to the word "mod_log_config."

Consistent with disclosed embodiments, device 200 may calculate an updated engineered feature (e.g. engineered feature 710) by multiplying the weights vector with the dataset, as described above with reference to FIG. 8. An updated weights vector may be calculated based on the updated engineered feature and the features in the dataset. This updated weights vector may assign non-zero values to weight elements corresponding to features appearing in documents together with "mod_log_config." For example, the presence or absence of the term "mod_log_config" may be associated with the presence or absence of the term "mod_mime," the name of an Apache HTTP Server module that associates a requested filename's extensions with the file's behavior or content. The updated weight vector may then include a non-zero value for a weight element corresponding to the term "mod_mime."

Consistent with disclosed embodiments, device 200 may calculate a further updated engineered feature by multiplying the updated weight vector with the dataset. This next iteration of the proposed systems and methods may identify terms like "mod_alias," the name of an Apache HTTP Server module that provides for manipulation and control of uniform resource locators. The presence or absence of this term may be associated with the presence or absence of "mod_log_config" and "mod_mime." Further iterations of the proposed systems and methods may identify additional associated terms. Device 200 may progressively update the engineered feature to reflect the importance of these identified terms. This iterative process may continue until a stopping condition (e.g., one of stopping conditions 570) is satisfied, as described with reference to FIG. 8.

Device 200 may subset the dataset using the engineered feature, as described with reference to FIG. 9. Device 200 may then generate additional engineered features from this subset of the dataset (e.g., subset 520). For example, device 200 may be configured to assign the weight element corresponding to the word "404" a weight of one. Device 200 may not be able to generate a useful engineered feature from this word when considered over the entire dataset, but may be able to generate a useful engineered feature when restricted to the subset of documents identified by the first engineered feature. For example, upon repeated iterations of the proposed methods and systems on this subset, device 200 may assign non-zero values to weight elements for terms such as "mod_rewrite," the name of an Apache HTTP Server module that provides for rule-based rewriting of requested URLs. These weights elements will define a corresponding second engineered feature.

Though device 200 may have generated this second engineered feature based on a subset of the documents (rows) in the dataset, this second engineered feature may be used to query the overall dataset. For example, device 200 may identify questions, answers, and comments in the overall Stack Overflow corpus based on the first and second engineered features. Subsequent queries concerning configuration conflicts in the Apache HTTP Server resulting in a "URL not found" error message may return documents addressing conflicts between "mod_rewrite" and "mod_alias."

Exemplary Implementation: Machine Translation

The proposed methods and systems may establish a high-level concordance between concepts in the first language and concepts in the second language using engineered features, while linking the engineered features for each language to specific words in that language using the weights vectors. In this manner, a limited number of available term-to-term translations can be leveraged to cover larger groups of related words in each language.

For example, device 200 could be configured to use the proposed methods and systems to process a first term-document matrix based on a corpus of documents in a first language and a second term-document matrix based on a corpus of documents in a second language. Each term-document matrix may include rows corresponding to documents in the first or second corpus and columns corresponding to words in the first or second corpus. Device 200 may be configured to calculate a first set of engineered features for the first language based on the first term-document matrix. Each of the engineered features in the first set would be associated with words in the first language, according to weights vectors in a first set of weights vectors.

Device 200 may also be configured to calculate a second set of engineered features for the second language based on the second term-document matrix. Each of the engineered features in the second set would be associated with words in the second language, according to weights vectors in a second set of weights vectors.

As described above, some translations may be available between words in the first language and words in the second language. Device 200 may be configured to use these existing translations to establish a correspondence between first engineered features in the first language and second engineered features in the second language. Device 200 may also use other methods known to one of skill in the art.

In some embodiments, when translating a term from a first language lacking a predetermined translation in the second language, device 200 may be configured to determine one of the first engineered features corresponding to the term. Device 200 may be configured to determine one or more of the second engineered features in the second language based on the established correspondence. In certain embodiments, device 200 may then determine one or more words in the second language associated with the second engineered features based on the second weights vectors. In some embodiments, device 200 may select one of the associated words for use in translating from the first language to the second language. Additional methods known to one of skill in the art may be used to inform this selection.

Exemplary Implementation: Recommendation Systems

A user may interact with device 200 to indicate preferred categories or types of items, but these preferred categories or types of items may represent only a small subset of items potentially available to the user. For example, a user may select a media item, such as a movie, from a database of media items. A set of discrete-valued features (e.g. feature Fn), a set of engineered features (e.g. EFS 530) and a corresponding set of weights (e.g. WS 540) may be defined for this database of media items.

In this example, the engineered features may comprise a first engineered feature corresponding to foreign movies, a second engineered feature corresponding to period dramas, and a third engineered feature corresponding to coming of age movies. As described above with respect to FIGS. 7a, 7b, and 8, each of these engineered features may represent weighted linear combinations of discrete-valued features of media items in the database of media items. As a non-limiting example, the context enabling an engineered feature to be identified as corresponding to period dramas, may be provided by the features identified as contributing significantly to that engineered feature. The set of engineered features may, for example, comprise rows corresponding to the media items. These rows may comprise engineered elements (e.g. engineered element 730) indicating the strength of the association between the media item corresponding to the row and the engineered feature corresponding to the column.

As discussed with reference to FIG. 10, device 200 may be configured to identify items similar to the selected media item based the engineered elements. For example, if the selected movie is strongly associated with foreign films and coming of age movies, then similar films may be recommended, even if the user has not expressed a preference for such films.

The foregoing description of the inventions, along with their associated embodiments, has been presented for purposes of illustration only. It is not exhaustive and does not limit the inventions to the precise form disclosed. Those skilled in the art will appreciate from the foregoing description that modifications and variations are possible in light of the above teachings or may be acquired from practicing the inventions. For example, as described herein, the terms "row" and "column" are not intended to limit the disclosed embodiments to any particular matrix orientation or data structure, as would be recognized by one of skill in the art.

As an additional example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments. Accordingly, the inventions are not limited to the above-described embodiments, but instead are defined by the appended claims in light of their full scope of equivalents.

What is claimed is:

1. A system for determining the structure of an electronic dataset, the system comprising:
one or more processors configured to perform the steps of:
receiving a matrix with a first dimension corresponding to items, a second dimension corresponding to features, and discrete-valued elements indicating a presence, absence, or frequency of the features in the items;
generating an engineered features set and a weights set for the matrix, the engineered features set and the weights set corresponding to latent structures in the matrix, generating the engineered features set and the weights set comprising:
generating a first engineered feature and a first weights vector corresponding to a first latent structure in the matrix, generating the first engineered feature and the first weights vector comprising:
updating the first engineered feature of the engineered features set using the matrix and the first weights vector of the weights set, and
updating the first weights vector of the weights set using a mutual information of the matrix and the first engineered feature; and
generating a second engineered feature and a second weights vector corresponding to a second latent structure using a subset of the matrix associated with the first latent structure, generating the second engineered feature and the second weights vector comprising:
determining the subset of the matrix using at least one of the first engineered feature and the first weights vector;
updating the second engineered feature of the engineered features set using the subset and the second weights vector of the weights set; and
updating the second weights vector of the weights set using a mutual information of the subset and the second engineered feature;
receiving a request indicating at least one of the engineered features set;
identifying items based on the matrix and the indicated at least one of the engineered features set; and
providing a response based on the identified items.

2. The system of claim 1, wherein the first engineered feature is updated and then the first weights vector is updated.

3. The system of claim 1, wherein the response comprises one or more of the identified items.

4. The system of claim 1, wherein the subset of the matrix depends on values of the first weights vector and a threshold value.

5. The system of claim 1, wherein the subset of the matrix depends on values of the first engineered feature and a threshold value.

6. The system of claim 1, wherein generating the engineered features set and the weights set further comprises generating clusters by clustering the items using at least the first engineered feature, and wherein the subset comprises rows of the matrix corresponding to items of a first one of the clusters.

7. The system of claim 6, the one or more processors further for associating an additional item with a second one of the clusters based on generated values of at least the first engineered feature for the additional item.

8. The system of claim 1, wherein:
a correlation between the first engineered feature and the matrix is negative, and
updating the first weights vector based on the mutual information of the matrix and the first engineered feature comprises calculating a negative of the mutual information of the first engineered feature and the matrix.

9. The system of claim 1, wherein the engineered features set includes a third engineered feature, and wherein generating the engineered features set and the weights set further comprises generating the third engineered feature and a third weights vector based on pre-categorized training data.

10. The system of claim 1, wherein generating the engineered features set and the weights set further comprises generating additional engineered features until a machine learning task performed using the first engineered feature and the additional engineered features satisfies a performance criterion.

11. A non-transitory computer-readable medium containing instructions that, when executed by one or more processors, cause a device to perform operations for determining the structure of an electronic dataset, the operations comprising:
receiving a discrete-valued dataset comprising rows corresponding to items and columns corresponding to features;
determining, based on the discrete-valued dataset:
a first engineered feature indicating a first latent structure in the discrete-valued dataset with elements of the first engineered feature corresponding to the items,
a first weights vector providing context for interpreting the first engineered feature with elements of the first weights vector corresponding to the features, and
wherein determining the first engineered feature comprises iteratively updating, until a condition is satisfied:
the elements of the first engineered feature based on a product of the first weights vector and rows of the discrete-valued dataset, and
the elements of the first weights vector based on a product of the first engineered feature and columns of the discrete-valued dataset;
generating a subset of the discrete-valued dataset based on at least the first engineered feature;
determining, using the subset of the discrete-valued dataset, a second engineered feature indicative of a second latent structure in the discrete-valued dataset and a second weights vector providing context for interpreting the second engineered feature; and
outputting indications of the first latent structure and the second latent structure.

12. The non-transitory computer-readable medium of claim 11, wherein the elements of the first engineered feature are updated and then the elements of the first weights vector are updated.

13. The non-transitory computer-readable medium of claim 11, the operations further comprising:
receiving a query item;
determining discrete values of the features for the query item;
determining values of the first engineered feature and the second engineered feature for the query item based on the first weights vector and the second weights vector;
determining one or more similar items in the discrete-valued dataset based on at least the first engineered feature and the second engineered feature; and
providing the one or more similar items to a user or non-transitory memory.

14. The non-transitory computer-readable medium of claim 11, wherein the subset of the discrete-valued dataset depends on the elements of the first weights vector and a threshold.

15. The non-transitory computer-readable medium of claim 11, wherein the subset of the discrete-valued dataset depends on the elements of the first engineered feature and a threshold.

16. The non-transitory computer-readable medium of claim 11, wherein generating the subset of the discrete-valued dataset based on at least the first engineered feature comprises clustering the items using at least the first engineered feature, and wherein the subset comprises rows of the discrete-valued dataset corresponding to items of a cluster.

17. The non-transitory computer-readable medium of claim 11, wherein:
a first element of the first weights vector corresponds to a first feature, and a value of the first element depends on a negative of a mutual information of the first engineered feature and a column of the discrete-valued dataset corresponding to the first feature; and
a correlation between the first engineered feature and the column of the discrete-valued dataset is negative.

18. The non-transitory computer-readable medium of claim 11, the operations further comprising calculating additional engineered features until a machine learning task performed using the first engineered feature and the additional engineered features satisfies a performance criterion.

19. A computer-implemented method for determining the structure of an electronic dataset, the method comprising:
receiving, on a computer, a first word corresponding to a term in a first term-document matrix for a first corpus of documents in a first language;
identifying a first engineered feature of the first term-document matrix corresponding to the first word;
determining a second engineered feature of a second term-document matrix corresponding to the first engineered feature, the second term-document matrix for a second corpus of documents in a second language;
identifying one or more second words in the second language corresponding to the second engineered feature; and
providing the identified one or more second words to a user or non-transitory memory.

20. The computer-implemented method of claim 19, wherein the first engineered feature and the second engineered feature correspond to a common latent structure.

21. The computer-implemented method of claim 19, wherein the first word concerns a concept in the first language and the identified one or more second words concern the concept in the second language.

* * * * *